United States Patent
Choi et al.

(10) Patent No.: US 9,924,502 B2
(45) Date of Patent: Mar. 20, 2018

(54) METHOD AND DEVICE FOR OBTAINING AND RECEIVING CONTROL INFORMATION IN WIRELESS COMMUNICATION SYSTEM

(71) Applicant: LG ELECTRONICS INC., Seoul (KR)

(72) Inventors: Hyeyoung Choi, Anyang-si (KR); Jinmin Kim, Anyang-si (KR); Seunghee Han, Anyang-si (KR); Hyukmin Son, Anyang-si (KR); Hyunwoo Lee, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 73 days.

(21) Appl. No.: 14/357,173

(22) PCT Filed: Nov. 7, 2012

(86) PCT No.: PCT/KR2012/009320
§ 371 (c)(1),
(2) Date: May 8, 2014

(87) PCT Pub. No.: WO2013/069956
PCT Pub. Date: May 16, 2013

(65) Prior Publication Data
US 2014/0307696 A1    Oct. 16, 2014

Related U.S. Application Data

(60) Provisional application No. 61/558,448, filed on Nov. 11, 2011.

(51) Int. Cl.
*H04W 4/00* (2009.01)
*H04W 72/04* (2009.01)
(Continued)

(52) U.S. Cl.
CPC ........ *H04W 72/042* (2013.01); *H04L 1/0038* (2013.01); *H04L 5/0094* (2013.01);
(Continued)

(58) Field of Classification Search
USPC ................. 370/248, 252, 254, 329
See application file for complete search history.

(56) References Cited

U.S. PATENT DOCUMENTS

2010/0296473 A1    11/2010    Kim et al.
2011/0075624 A1    3/2011    Papasakellariou et al.
(Continued)

FOREIGN PATENT DOCUMENTS

WO    2011/122852    10/2011

OTHER PUBLICATIONS

PCT International Application No. PCT/KR2012/009320, Written Opinion of the International Searching Authority dated Mar. 26, 2013, 14 pages.

*Primary Examiner* — Yemane Mesfin
*Assistant Examiner* — Mon Cheri Davenport
(74) *Attorney, Agent, or Firm* — Lee Hong Degerman Kang & Waimey

(57) ABSTRACT

A method of obtaining control information on a terminal in a wireless communication system according to an embodiment of the present invention includes performing blind decoding for a joint DCI format including at least two DCI formats for at least two terminals including the terminal, wherein the size of the joint DCI format is determined depending on the kind of the at least two DCI formats, and the terminal further receives information for performing blind decoding on the DCI format for the terminal in the joint DCI format.

7 Claims, 11 Drawing Sheets

(a)

(b)

(51) Int. Cl.
*H04L 1/00* (2006.01)
*H04W 88/06* (2009.01)
*H04W 88/10* (2009.01)
*H04L 5/00* (2006.01)

(52) U.S. Cl.
CPC ........... *H04W 88/06* (2013.01); *H04W 88/10* (2013.01); *H04L 5/001* (2013.01); *H04L 5/0037* (2013.01); *H04L 5/0053* (2013.01); *H04L 5/0055* (2013.01)

(56) References Cited

U.S. PATENT DOCUMENTS

| | | | |
|---|---|---|---|
| 2011/0085513 A1* | 4/2011 | Chen | H04W 72/042 370/330 |
| 2011/0171964 A1* | 7/2011 | Lin | H04L 5/0023 455/450 |
| 2011/0194524 A1 | 8/2011 | Hedlund et al. | |
| 2014/0086184 A1* | 3/2014 | Guan | H04W 72/1289 370/329 |
| 2014/0169319 A1* | 6/2014 | Yang | H04W 72/0413 370/329 |

\* cited by examiner

MeNB : macro eNodeB  
PeNB : pico eNodeB  
FeNB : femto eNodeB

MUE : macro UE  
PUE : pico UE  
FUE : femto eNodeB

METHOD AND DEVICE FOR OBTAINING AND RECEIVING CONTROL INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2012/009320, filed on Nov. 7, 2012, which claims the benefit of U.S. Provisional Application Serial No. 61/558,448, filed on Nov. 11, 2011, the contents of which are all hereby incorporated by reference herein in their entirety.

FIELD OF THE INVENTION

The following description relates to a method for obtaining/transmitting control information in a wireless communication system and a device for the same.

BACKGROUND ART

Wireless communication systems are evolving extensively in order to provide diverse types of communication services, such as audio and video data, and so on. Generally, a mobile communication system corresponds to a multiple access system that shares available system resource (e.g., bandwidth, transmission power, and so on) so as to be capable of supporting communication between multiple users. Examples of the multiple access system include a CDMA (code division multiple access) system, a FDMA (frequency division multiple access) system, a TDMA (time division multiple access) system, an OFDMA (orthogonal frequency division multiple access) system, an SC-FDMA (single carrier frequency division multiple access) system, an MC-FDMA (multi carrier frequency division multiple access) system, and so on.

DETAILED DESCRIPTION OF THE INVENTION

Technical Objects

The present invention relates to a method and device for obtaining/transmitting joint downlink control information.

The technical objects of the present invention will not be limited only to the objects described above. Accordingly, technical objects that have not been mentioned above or additional technical objects of the present application may become apparent to those having ordinary skill in the art from the description presented below.

Technical Solutions

According to a first technical aspect of the present invention, as a method of a user equipment for acquiring control information in a wireless communication system, the method for acquiring control information includes the step of performing blind decoding for a joint DCI format including at least two or more DCI formats, for at least two or more user equipments including the user equipment, wherein a size of the joint DCI format is decided in accordance with the two or more DCI format types, and wherein the user equipment further receives information for performing blind decoding on a DCI format for the user equipment in the joint DCI format.

According to a second technical aspect of the present invention, as a user equipment device in a wireless communication system, the user equipment device includes a reception module; and a processor, wherein the processor is configured to perform blind decoding for a joint DCI format including at least two or more DCI formats, for at least two or more user equipment devices including the user equipment device, wherein a size of the joint DCI format is decided in accordance with the two or more DCI format types, and to further receive information for performing blind decoding on a DCI format for the user equipment device in the joint DCI format.

According to a third technical aspect of the present invention, as a method of a base station for transmitting control information in a wireless communication system, the method for transmitting control information includes the step of transmitting a joint DCI format including at least two or more DCI formats for at least two or more user equipments, wherein a size of the joint DCI format is decided in accordance with the two or more DCI format types, and wherein the base station further transmits information allowing a user equipment to perform blind decoding on a DCI format for the user equipment in the joint DCI format.

According to a fourth technical aspect of the present invention, as a base station device in a wireless communication system, the base station device includes a transmission module; and a processor, wherein the processor is configured to transmit a joint DCI format including at least two or more DCI formats for at least two or more user equipments, wherein a size of the joint DCI format is decided in accordance with the two or more DCI format types, and to further transmit information allowing a user equipment to perform blind decoding on a DCI format for the user equipment in the joint DCI format.

The first to fourth technical aspects of the present invention may include all or some of the following.

The information may include a number of the at least two or more DCI format, information on a position index of a DCI format for the user equipment among the at least two or more DCI formats, and a starting point of the at least two or more DCI formats.

The information may include a number of the at least two or more DCI format, information on a position index of a DCI format for the user equipment among the at least two or more DCI formats, and a type of the at least two or more DCI formats.

In case the at least two or more DCI formats are different from one another, DCI format types being included in the two or more DCI formats may be limited to two types.

A cyclic redundancy check attached to the joint DCI format may correspond to a radio network temporary identifier shared by two to more user equipments.

The at least two or more DCI formats may be dependent on a transmission mode set up for the two or more user equipments.

Advantageous Effects

According to the present invention, by using downlink control information, which is joint for two or more user equipments, control information may be efficiently transceived (or transmitted/received).

The effects of the present invention will not be limited only to the effects described above. Accordingly, effects that have not been mentioned above or additional effects of the present application may become apparent to those having ordinary skill in the art from the description presented below.

BEST MODE FOR CARRYING OUT THE PRESENT INVENTION

Figure 1:
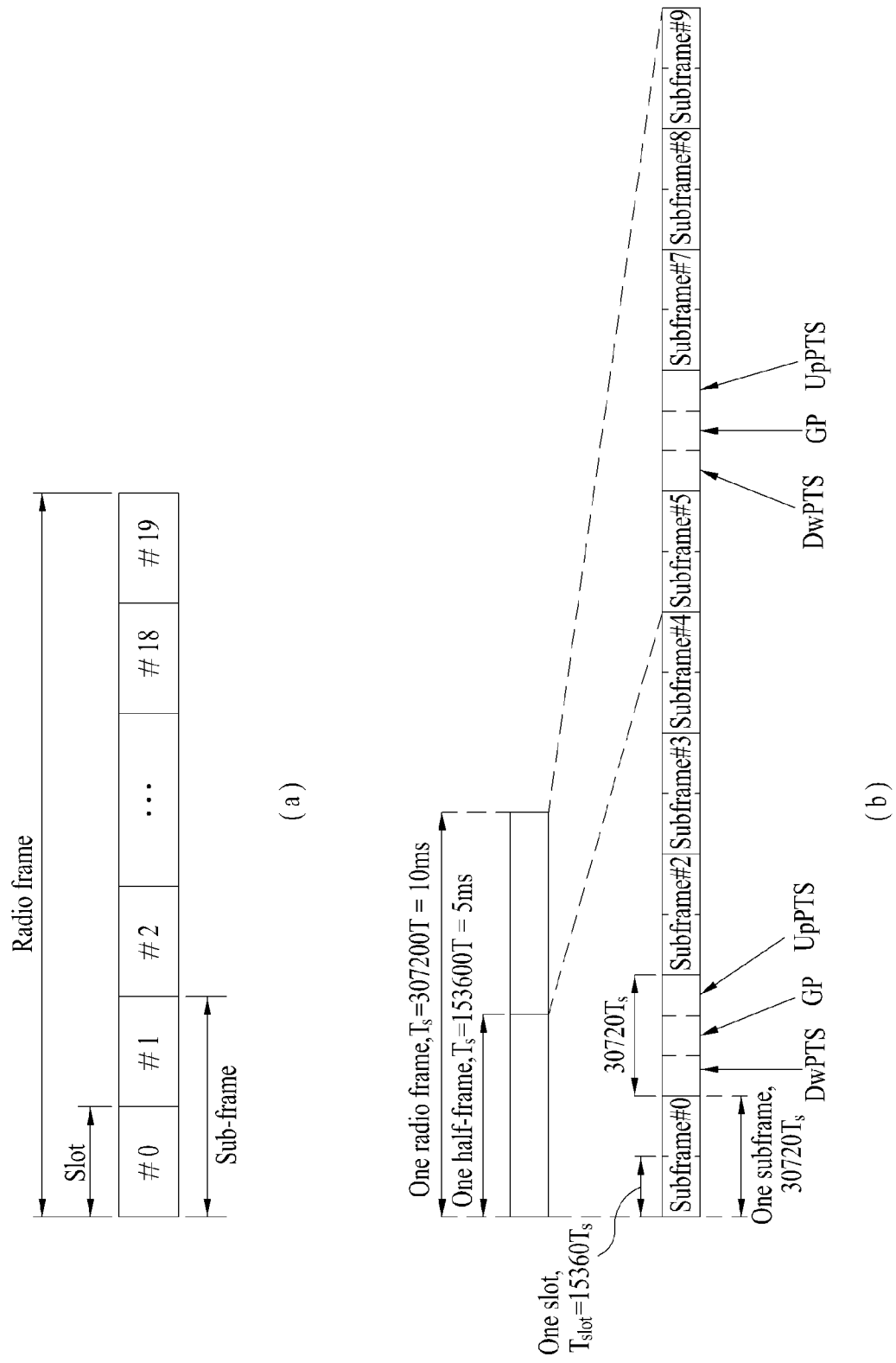
FIG. 1 illustrates an exemplary structure of a wireless frame.

The embodiments described below correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention.

In the description of the present invention, the embodiments of the present invention will be described by mainly focusing on the data transmission and reception relation between the base station and the terminal (or user equipment). Herein, the base station may refer to a terminal node of the network that performs direct communication with the terminal Occasionally, in the description of the present invention, particular operations of the present invention that are described as being performed by the base station may also be performed by an upper node of the base station.

More specifically, in a network consisting of multiple network nodes including the base station, it is apparent that diverse operations that are performed in order to communicate with the terminal may be performed by the base station or b network nodes other than the base station. Herein, the term 'Base Station (BS)' may be replaced by other terms, such as fixed station, Node B, eNode B (eNB), Access Point (AP), and so on. The term relay may be replaced by terms including Relay Node (RN), Relay Station (RS), and so on. And, the term 'Terminal' may be replaced by terms including UE (User Equipment), MS (Mobile Station), MSS (Mobile Subscriber Station), SS (Subscriber Station), and so on.

The specific terms used in the following description of the present invention are provided to facilitate the understanding of the present invention. And, therefore, without deviating from the technical scope and spirit of the present invention, such specific terms may also be varied and/or replaced by other terms.

In some cases, in order to avoid any ambiguity in the concept (or idea) of the present invention, some of the structures and devices disclosed (or mentioned) in the present invention may be omitted from the accompanying drawings of the present invention, or the present invention may be illustrated in the form of a block view focusing only on the essential features or functions of each structure and device. Furthermore, throughout the entire description of the present invention, the same reference numerals will be used for the same elements of the present invention.

Herein, the embodiments of the present invention may be supported by at least one the disclosed standard documents for wireless access systems including the IEEE 802 system, the 3GPP LTE system, the LTE-A (LTE-Advanced) system, and the 3GPP2 system. More specifically, among the embodiments of the present invention, partial operation steps or structures of the present invention, which have been omitted from the description of the present invention in order to specify and clarify the technical scope and spirit of the present invention may also be supported by the above-described standard documents. Furthermore, the terms disclosed in the description of the present invention may be described based upon the above-mentioned standard documents.

The technology described below may be used in a wide range of wireless access systems, such as CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and so on. Herein, the CDMA may be realized by a radio technology such as UTRA (Universal Terrestrial Radio Access) or CDMA2000. The TDMA may be realized by a radio technology such as GSM (Global System for Mobile communications)/GPRS (General Packet Radio Service)/EDGE (Enhanced Data Rates for GSM Evolution). The OFDMA may be realized by a radio technology such as IEEE 802.11 (Wi-Fi), IEEE 802.16 (WiMAX), IEEE 802-20, E-UTRA (Evolved UTRA), and so on. The UTRA corresponds to a portion of the UMTS (Universal Mobile Telecommunications System). And, as a portion of the E-UMTS (Evolved UMTS) using the E-UTRA, the 3GPP (3rd Generation Partnership Project) LTE (long term evolution) system adopts the OFDMA in a downlink and adopts the SC-FDMA in an uplink. The LTE-A (LTE-Advanced) corresponds to an evolved version of the 3GPP LTE system. The WiMAX may be described based upon the IEEE 802.16e standard (WirelessMAN-OFDMA Reference System) and the evolved IEEE 802.16m standard (Wireless-MAN-OFDMA Advanced system). For the clarity in the description of the present invention, the present invention will be described based upon the 3GPP LTE system and the 3GPP LTE-A system. Nevertheless, the scope and spirit of the present invention will not be limited only to those of the 3GPP LTE system and the 3GPP LTE-A system.

FIG. 1 illustrates an exemplary structure of a wireless (or radio) frame being used in a 3GPP LTE system. Referring to FIG. 1(a), one wireless (or radio) frame includes 10 sub-frames, and one subframe includes 2 slots in a time domain. The time for transmitting one subframe is defined as a Transmission Time Interval (TTI). For example, one subframe may have the length of 1 ms, and one slot may have the length of 0.5 ms. One slot may include a plurality of OFDM symbols in the time domain. Since the 3GPP LTE system uses the OFDMA method during a downlink, the OFDM symbol may indicate one symbol length (period). During an uplink, one symbol may be referred to as an SC-FDMA symbol or a symbol length. A Resource Block (RB) corresponds to a resource allocation unit, and, in a slot, the resource block (RB) includes a plurality of consecutive sub-carriers. However, the above-described wireless frame structure is merely exemplary. Therefore, the number of subframes included in a wireless frame, the number of slots included in one subframe, or the number of OFDM symbols being included in one slot may be varied in many different ways.

FIG. 1(b) illustrates an exemplary structure of a type 2 radio frame. The type 2 radio frame consists of 2 half frames. Each half frame consists of 5 subframes, a DwPTS (Downlink Pilot Time Slot), a Guard Period (GP), and an UpPTS (Uplink Pilot Time Slot). Herein, one subframe consists of 2 slots. The DwPTS is used for initial cell search, synchronization, or channel estimation, which are performed by a user equipment. The UpPTS is used for channel estimation, which is performed by a base station, and for uplink transmission synchronization, which is performed by the user equipment. The guard period corresponds to a period (or section) for eliminating interference occurring in an uplink due to a multiple path delay of a downlink signal between an uplink and a downlink.

Herein, the structure of the radio frame is merely exemplary. And, therefore, the number of subframes included in the radio frame or the number of slots included in a subframe, and the number of symbols included in one slot may be diversely varied.

Figure 2:
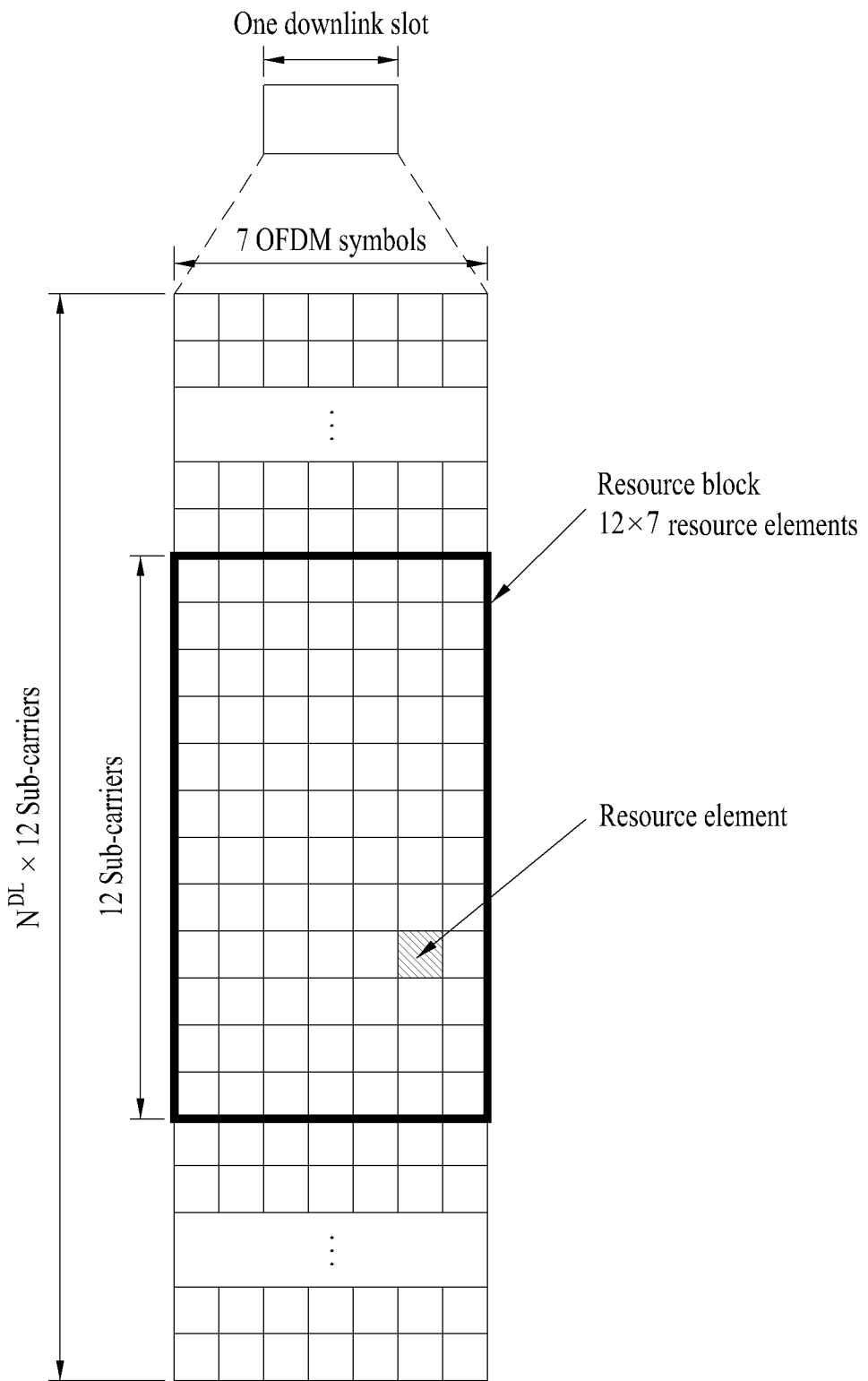
FIG. 2 illustrates a resource grid of a downlink slot.

FIG. 2 illustrates a resource grid of a downlink slot. Although it is shown in FIG. 2 that one downlink slot includes 7 OFDM symbols in a time domain, and that one resource block (RB) includes 12 sub-carriers in a frequency domain, this is merely exemplary. And, therefore, the present invention will not be limited only to the example presented in FIG. 2. For example, in case of a general Cyclic Prefix (CP), one slot includes 7 OFDM symbols. Alternatively, in case of an extended Cyclic Prefix (extended-CP), one slot may include 6 OFDM symbols. Referring to FIG. 2, each element configuring the resource grid is referred to as a resource element (RE). One resource block includes 12×7 resource elements. An NDL number of resource blocks included in a downlink slot may vary in accordance with a downlink transmission bandwidth. The structure of an uplink slot may be identical to the above-described structure of the downlink slot.

Figure 3:
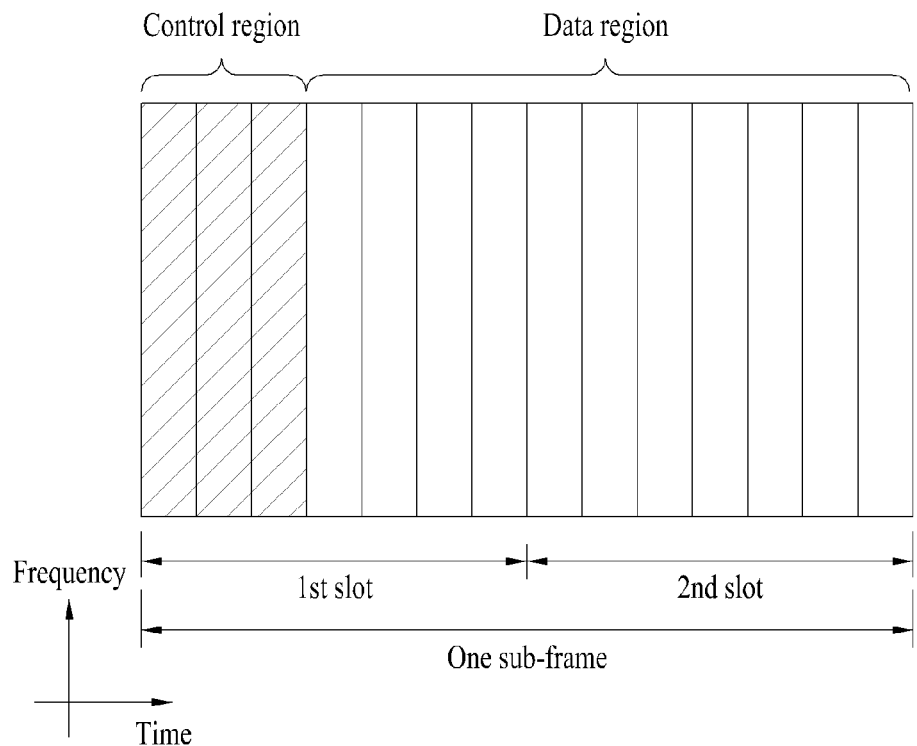
FIG. 3 illustrates an exemplary structure of a downlink subframe.

FIG. 3 illustrates an exemplary structure of a downlink subframe. A maximum of 3 OFDM symbols located at the front portion of a first slot within one subframe corresponds to a control region wherein a control channel is allocated (or assigned). The remaining OFDM symbols correspond to a data region wherein a Physical Downlink Shared Channel (PDSCH) is assigned. Downlink control channels that are being used in the LTE system may include a Physical Control Format Indicator Channel (PCFICH), a Physical Downlink Control Channel (PDCCH), a Physical Hybrid automatic repeat request Indicator Channel (PHICH), and so on.

The PCFICH includes information on the number of OFDM symbols being transmitted from the first OFDM symbol of a subframe and being used in the control channel transmission within the subframe.

As a response to an uplink transmission, the PHICH includes HARQ ACK/NACK signals.

The PDCCH transmits Downlink Control Information (DCI). Depending upon its format, the DCI may include uplink or downlink scheduling information, or the DCI may include uplink transmission power control information respective to an arbitrary user equipment group.

DCI Format

According to the current LTE-A (release-10), DCI formats 0, 1, 1A, 1B, 1C, 1D, 2, 2A, 2B, 2C, 3, 3A, 4 are defined. Herein, DCI formats 0, 1A, 3, 3A have been regulated to have the same message size in order to reduce the number of sessions for blind decoding, which will be described later on. According to the purpose of the control information that is to be transmitted, such DCI formats may be divided into i) DCI formats 0, 4, which are used for uplink scheduling grants, ii) DCI formats 1, 1A, 1B, 1C, 1D, 2, 2A, 2B, 2C, which are used for downlink scheduling grants, and iii) DCI formats 3, 3A, which are used for power control commands.

In case of DCI format 0, which is used for an uplink scheduling grant, may include a carrier indicator being required with respect to carrier aggregation, which is to be described later on, an offset being used for differentiating DCI format 0 from DCT format 1A (flag for format 0/format 1A differentiation), a hopping flag indicating whether or not frequency hopping is being used in the uplink PUSCH transmission (frequency hopping flag), information on resource block allocation (or assignment) that is to be used by the user equipment for PUSCH transmission (resource block assignment), modulation and coding scheme, a new data offset being used for emptying a buffer for an initial transmission respective to an HARQ process (new data indicator), a transmission power control command for PUSCH (TPC command for scheduled for PUSCH), information on a cyclic shift for DMRS (Demodulation reference signal) (cyclic shift for DM RS and OCC index), an uplink index (UL index) required in a TDD operation, information requesting for Channel Quality Information (CSI request), and so on. Meanwhile, since DCI format 0 uses synchronized HARQ, DCI format 0 does not include a redundancy version as in the DCI formats that are related to downlink scheduling allocation. In case of a carrier offset, when cross-carrier scheduling is not used, the carrier offset is not included in the DCI format.

DCI format 4 is a format newly included in LTE-A release 10, and, herein, DCI format 4 is used for supporting the application of spatial multiplexing in an uplink transmission in the LTE-A. In comparison with DCI format 0, since DCI format 4 includes more information for spatial multiplexing, DCI format 4 has a larger message size and further includes additional control information in addition to the control information included in DCI format 0. More specifically, DCI format 4 further includes modulation and coding schemes for a second transport block (or transmission block), precoding information for multi-antennae transmission, sounding reference signal request (SRS request) information.

Meanwhile, since DCI format 4 has a larger size than DCI format 0, DCI format 4 does not include an offset differentiating DCI format 0 from DCI format 1A.

DCI formats 1, 1A, 1B, 1C, 1D, 2, 2A, 2B, 2C, which are related to downlink scheduling grants, may be broadly divided into 1, 1A, 1B, 1C, 1D, which do not support spatial multiplexing, and 2, 2A, 2B, 2C, which support spatial multiplexing.

DCI format 1C supports only frequency contiguous assignment (or allocation) as compact downlink allocation, and, as compared to other formats, DCI format 1C does not support carrier offset, redundancy version.

DCI format 1A corresponds to a format for downlink scheduling and random access procedure. Herein, DCI format 1A may include a carrier offset, an indicator notifying whether or not a downlink distribution (or dispersion) transmission is being used, PDSCH resource allocation (or assignment) information, modulation and coding scheme, a redundancy version, an HARQ processor number for notifying a processor, which is used for soft combining, a new data offset being used for emptying a buffer for an initial transmission respective to an HARQ process (new data indicator), a transmission power control command for PUCCH, an uplink index (UL index) required in a TDD operation, and so on.

In case of DCI format 1, most of the control information is similar to DCI format 1A. However, as compared to the fact that DCI format 1A is related to contiguous resource allocation, DCI format 1 supports non-contiguous resource allocation. Therefore, since DCI format 1 further includes a resource allocation header, control signaling overhead may increase more or less as a trade-off in that the flexibility in resource allocation is increased.

As compared to DCI format 1, DCI formats 1B, 1D are identical to one another in that each of DCI formats 1B, 1D includes precoding information. DCI format 1B includes PMI verification, and DCI format 1D includes downlink power offset information. With the exception for such information, the control information included in DCI formats 1B, 1D is mostly identical to the control information of DCI format 1A.

DCI formats 2, 2A, 2B, 2C essentially include most of the control information included in DCI format 1A and further include information for spatial multiplexing. Herein, the further included information corresponds to modulation and coding schemes related to the second transport block, a new data offset, and a redundancy version.

DCI format 2 supports closed-loop spatial multiplexing, and DCI format 2A supports open-loop spatial multiplexing. Both formats include precoding information. DCI format 2B supports dual layer spatial multiplexing and further includes information on cyclic shift for DMRS. DCI format 2C may be understood as an extension of DCI format 2B and supports spaspatial multiplexing of up to eight layers.

DCI formats 3, 3A may be used to supplement the transmission power control information, which is included in the above-described DCI formats for uplink scheduling grant and downlink scheduling allocation (or assignment), i.e., may be used for supporting semi-persistent scheduling. In case of DCI format 3, a 1-bit command is used per user equipment, and, in case of DCI format 3A, a 2-bit command is used for user equipment.

Among the above-described DCI formats, any one DCI format may be transmitted through on PDCCH, and multiple PDCCHs may be transmitted within the control region. The user equipment may monitor multiple PDCCHs.

PDCCH Processing

In transmitting DCI within a PDCCH, a Cyclic Redundancy Check (CRC) is added (or attached) to the DCI, and, during this process, a Radio network temporary identifier (RNTI) is masked. Herein, in case of the RNTI, different RNTIs may be used depending upon the transmission purpose of the DCI. More specifically, in case of a paging message related to network initiated connection settings, P-RNTI may be used, when related to random access, RA-RNTI may be used, and when related to a System Information Block (SIB), SI-RNTI may be used. Additionally, in case of a unicast transmission, C-RNTI, which corresponding to a unique user equipment identifier, may be used. The DCI having CRC added thereto is coded at a predetermined coding rate, and, thereafter, the DCI is adjusted to best fit the resource size being used for the transmission through rate-matching.

In performing the above-described transmission of the PDCCH, a Control Channel Element (CCE), which corresponds to a contiguous logical allocation unit, is used when mapping the PDCCH to REs in order to perform efficient processing. The CCE is configured of 36 REs, and this corresponds to 9 Resource element group (REG) units. The number of CCEs that are required for a specific PDCCH may vary in accordance with a DCI payload, which corresponds to the size of the control information, a cell bandwidth, a channel coding rate, and so on. More specifically, the number of CCEs for a specific PDCCH may be defined as shown below in Table 1 in accordance with the PDCCH format.

TABLE 1

| PDCCH Format | Number of CCEs | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

As shown in Table 1, the number of CCEs may vary depending upon the PDCCH format. Herein, for example, the transmitting end may adaptively used the IDDCH format, such as changing (or shifting) to PDCCH format 2, in case the channel state becomes poor (or degraded) while the transmitting end is using PDCCH format 0.

Blind Decoding

For the PDCCH, among the above-described four different formats, any one of the formats may be used. However, this is not notified to the user equipment. Therefore, in the position of the user equipment, the user equipment is required to perform decoding without knowing the PDCCH format, and, this is referred to as blind decoding. However, since having the UE decode all available CCEs being used in the downlink for each PDCCH format causes a large burden on the user equipment, a Search Space is defined based upon limitations of a scheduler and the number of decoding attempts.

More specifically, the search space corresponds to a group of candidate PDCCHs, which are configured of CCEs, which the user equipment is required to attempt decoding at an Aggregation Level. Herein, the aggregation level and the number of PDCCH candidates may be defined as shown below in Table 2.

TABLE 2

| Search Space | Aggregation Level | Size (CCE units) | Number of PDCCH Candidates |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

As shown in Table 2, since 4 different aggregation levels exist, the user equipment may have multiple search spaces in accordance with each aggregation level.

Additionally, as shown in Table 2, the search space may be divided into a UE-specific search space and a common search space. The UE-specific search space is designated for specific user equipments (UEs), wherein each UE may monitor the UE-specific search space (attempt to perform decoding on a PDCCH candidate group in accordance with an available DCI format), so as to verify the RNTI and CRC masked to the PDCCH. And, then, when the verified RNTI and CRC are valid, the UE may acquire the control information.

The common search space is designated for dynamic scheduling respective to system information or paging messages, and so on, such as a case when multiple user equipments or all user equipments are required to receive the PDCCH. However, the common search space may be used as a search space designated for a specific user equipment for resource management. Additionally, the common search space may be overlapped with the UE-specific search space.

Figure 4:
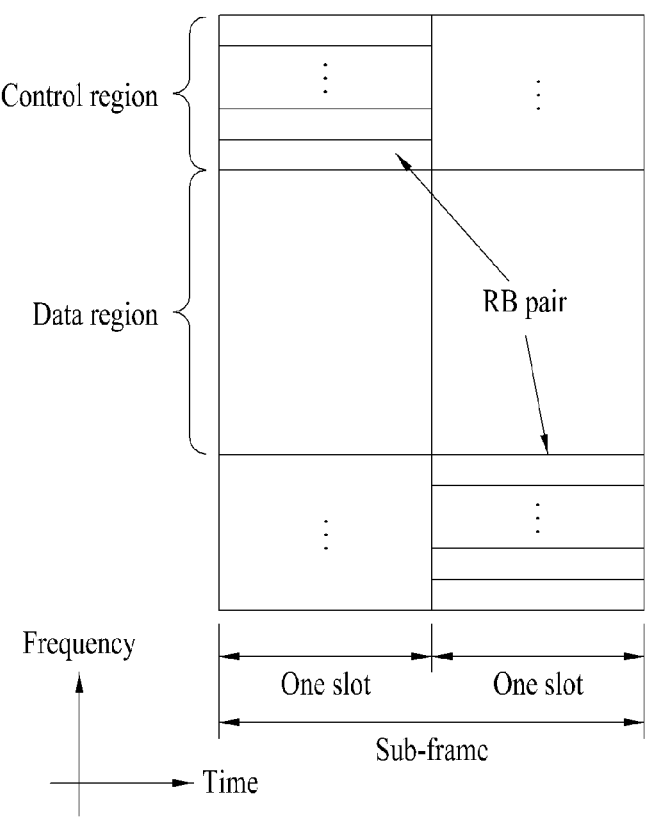
FIG. 4 illustrates an exemplary structure of an uplink subframe.

FIG. 4 illustrates an exemplary structure of an uplink subframe. In a frequency domain, an uplink subframe may be divided into a control region and a data region. A Physical Uplink Control Channel (PUCCH) including uplink control information is allocated to the control region. And, a Physical uplink shared channel (PUSCH) including user data is allocated to the data region. In order to maintain the characteristic of a unique (or single) carrier, one user equipment does not transmit the PUCCH and the PUSCH at the same time. The PUCCH for a user equipment is allocated to a resource block pair (RB pair) within a subframe. Each of the resource blocks (RBs) belonging to the RB pair occupies a different sub-carrier for 2 slots. This state may be referred to as the resource block pair, which is allocated to the PUCCH, as being frequency-hopped at the slot boundary.

PHICH (Physical Hybrid-ARQ Indicator Channel)

Figure 5:
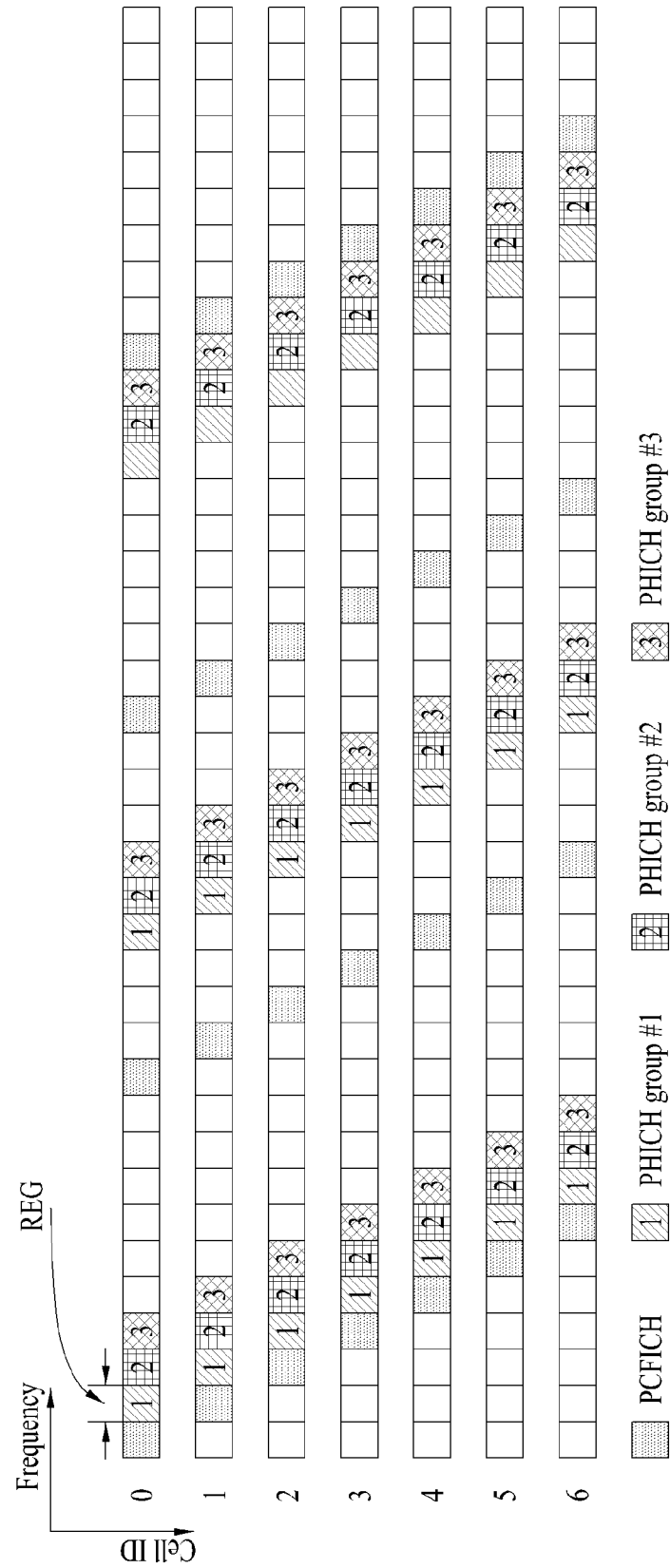
FIG. 5 illustrates appositions of PCFICH and PHICH channel generally applied in a specific bandwidth.

FIG. 5 illustrates appositions of PCFICH and PHICH channel generally applied in a specific bandwidth. ACK/NACK information on an uplink data transmission is transmitted through the PHICH. A plurality of PHICH groups is configured in one subframe, and multiple PHICHs exist in one PHICH group. Accordingly, PHICH channels respective to multiple user equipments exist in one PHICH group.

As shown in FIG. 5, in the multiple PHICH groups, the PHICH allocation for each user equipment is realized by using a lowest Physical Resource Block (PRB) index of PUSCH resource allocation and a Cyclic Shift index for a Demodulation RS (DMRS), which is transmitted through an uplink grant PDCCH. The DMRS corresponds to an uplink reference signal, and the DMRS corresponds to a signal that is being provided along with an uplink transmission for channel estimation for demodulating uplink data. Additionally, the PHICH resource may be notified through an index pair, such as $(n_{PHICH}^{group}, n_{PHICH}^{seq})$, and, at this point, in $(n_{PHICH}^{group}, n_{PHICH}^{seq})$, $n_{PHICH}^{group}$ indicates a PHICH group number, and $n_{PHICH}^{seq}$ indicates an orthogonal sequence index within a corresponding PHICH group. $n_{PHICH}^{group}$ and $n_{PHICH}^{seq}$ may be defined as shown below in Equation 1.

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS}) \bmod 2 N_{SF}^{PHICH}$$

[Equation 1]

In Equation 1, $n_{DMRS}$ corresponds to a cyclic shift that is applied to a DMRS, which is used for an uplink transmission related to PHICH, and $n_{DMRS}$ is mapped to a 'cyclic shift for DMRS' field of a most recent uplink grant control information (e.g., DCI format 0 or 4) respective to a transport block (TB), which is related to the corresponding PUSCH transmission. For example, the 'cyclic shift for DMRS' field of a most recent uplink grant DCI format may have the size of 3 bits, and, when this field is given a value of '000', $n_{DMRS}$ may be set to have a value of '0'.

In Equation 1, $N_{SF}^{PHICH}$ corresponds to a spreading factor size, which is used for PHICH modulation. $I_{PRB\_RA}^{lowest\_index}$ corresponds to a lowest PRB index within a first slot of the corresponding PUSCH transmission. $I_{PHICH}$ is assigned with a value of 1 only in a special case (a case when settings are made to UL/DL configuration 0, and when PUSCH transmission is performed in subframe n=4 or 9) within a TDD system, and $I_{PHICH}$ is assigned with a value of 0 in other cases. $N_{PHICH}^{group}$ corresponds to a number of PHICH groups set up by a higher layer and may be defined as shown below in Equation 2.

$$N_{PHICH}^{group} = \begin{cases} \lceil N_g (N_{RB}^{DL}/8) \rceil & \text{for normal cyclic prefix} \\ 2 \cdot \lceil N_g (N_{RB}^{DL}/8) \rceil & \text{for extended cyclic prefix} \end{cases}$$

[Equation 2]

In Equation 2, $N_g$ corresponds to information on the amount (or size) of a PHICH resource being transmitted to a Physical Broadcast Channel (PBCH), and $N_g$ has a size of 2 bits and is expressed as ($N_g \in \{1/6, 1/2, 1, 2\}$). In Equation 2, $N_{RB}^{DL}$ corresponds to a number of resource blocks being set up in a downlink.

Additionally, an example of an orthogonal sequence, which is defined in the legacy (or conventional) 3GPP LTE release 8/9, is shown below in Table 3.

TABLE 3

| | Orthogonal sequence | |
|---|---|---|
| Sequence index $n_{PHICH}^{seq}$ | Normal cyclic prefix $N_{SF}^{PHICH} = 4$ | Extended cyclic prefix $N_{SF}^{PHICH} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

Figure 6:
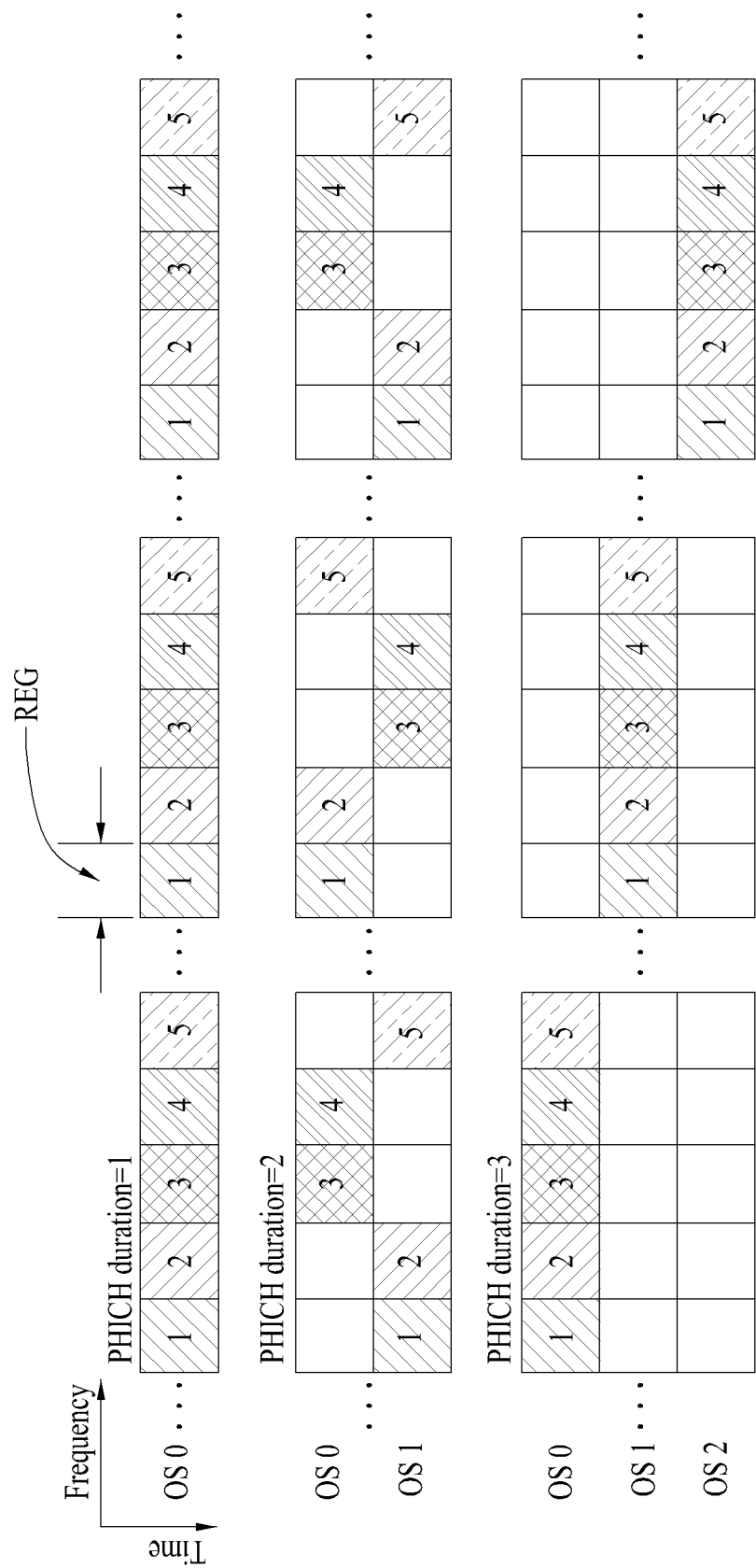
FIG. 6 illustrates a position of a downlink element having a PHICH group mapped thereto.
Figure 9:
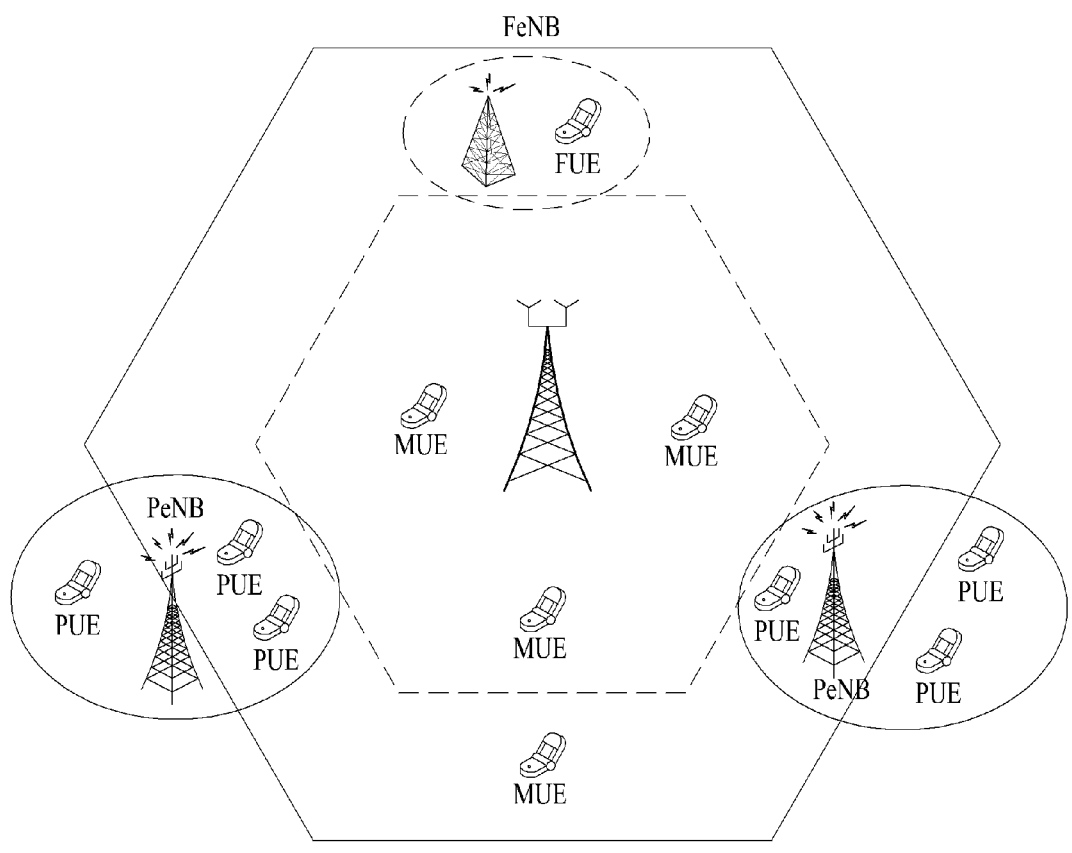
FIG. 9 illustrates a drawing showing a heterogeneous network.

FIG. 6 illustrates a position of a downlink element having a PHICH group mapped thereto. Depending upon the PHICH duration, as shown in FIG. 9, the PHICH group may be configured in a difference time domain (i.e., a different OS (OFDM Symbol)) within one subframe.

Carrier Aggregation

Figure 7:
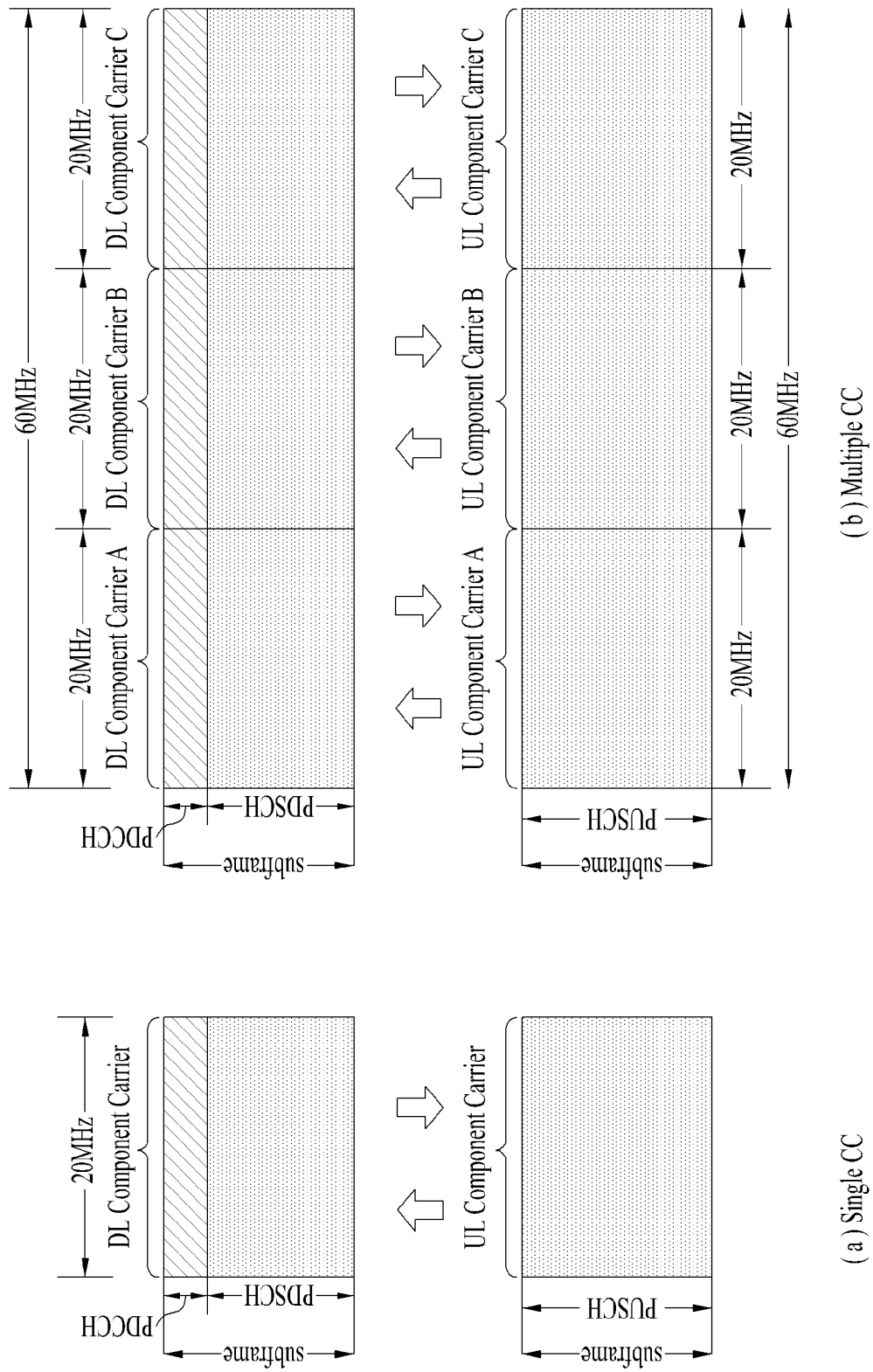
FIG. 7 illustrates a drawing for describing carrier aggregation.

FIG. 7 illustrates a drawing for describing carrier aggregation. Prior to describing carrier aggregation, the concept of a cell being adopted for managing radio resources in the LTE-A will hereinafter be described firsthand. A cell may be understood as a combination of a downlink resource and an uplink resource. Herein, the uplink resource does not correspond to an essential element, and, therefore, a cell may be configured only of a downlink resource or may be configured of both the downlink resource and the uplink resource. However, this is a definition established in the current LTE-A release 10. And, an opposite case may also be realized, i.e., a cell may be configured only of the uplink resource. The downlink resource may be referred to as a Downlink component carrier (DL CC), and the uplink resource may be referred to as an Uplink component carrier (UL CC). The DL CC and the UL CC may be expressed as carrier frequency, and the carrier frequency signifies a center frequency within the corresponding cell.

A cell may be divided into a primary cell (PCell), which operates in a primary frequency, and a secondary cell (SCell), which operates in a secondary frequency. The PCell and the SCell may be collectively referred to as a serving cell. In case of the PCell, a cell being designated when the user equipment performs an initial connection establishment procedure or during a connection re-establishment procedure or a handover procedure, may become the PCell. More specifically, the PCell may be understood as a cell that becomes a control-related center in carrier aggregation environment, which will be described in detail later on. The user equipment may be assigned (or allocated) with the PUCCH from its own PCell and may then transmit the allocated PUCCH. The SCell may be configured after RRC (Radio Resource Control) connection establishment, and the SCell may be used for providing additional radio resource. In the carrier aggregation environment, all serving cells excluding the PCell may be viewed as the SCell. In case of a user equipment that is in an RRC_CONNECTED state, yet in case carrier aggregation is not set up or is case the user equipment does not support carrier aggregation, only a single serving cell consisting only of PCells exist. Conversely, in case of a user equipment that is in the RRC_CONNECTED state and that is set up with carrier aggregation, at least one or more serving cells exist, and PCells and all SCells are included in all serving cells. For a user equipment supporting carrier aggregation, after an initial security activation procedure is initiated, the network may configure at least one or more SCells in additional to the PCell, which is configured at the beginning of the connection establishment procedure.

Hereinafter, carrier aggregation will be described with reference to FIG. 7. Carrier aggregation corresponds to a technology that has been adopted to allow the usage of a broader (or wider) band in order to meet with the requirements of a high-speed transmission rate. Carrier aggregation may be defined as an aggregation of at least 2 or more component carriers (CCs), each having a different frequency. Referring to FIG. 7, FIG. 7(a) illustrates a subframe in a case when one CC is used in the legacy LTE system, and FIG. 7(b) illustrates a subframe in a case when carrier aggregation is being used. For example, it is illustrates in FIG. 7(b) that 3 CCs of 20 MHz are used, thereby supporting a bandwidth of a total of 60 MHz. Herein, each CC may be continuous or may be non-continuous (or discontinuous).

The user equipment may simultaneously receive and monitor downlink data from a plurality of DL CCs. A linkage between each DL CC and UL CC may be designated by the system information. The DL CC/UL CC link may be fixed to the system or may be semi-statically configured. Additionally, even if the entire system band is configured of N number of CCs, the frequency band through which a specific user equipment may perform monitoring/reception may be limited M(<N) number of CCs. Diverse parameters respective to carrier aggregation may be set up by a cell-specific method, a UE group-specific or UE-specific method.

Figure 8:
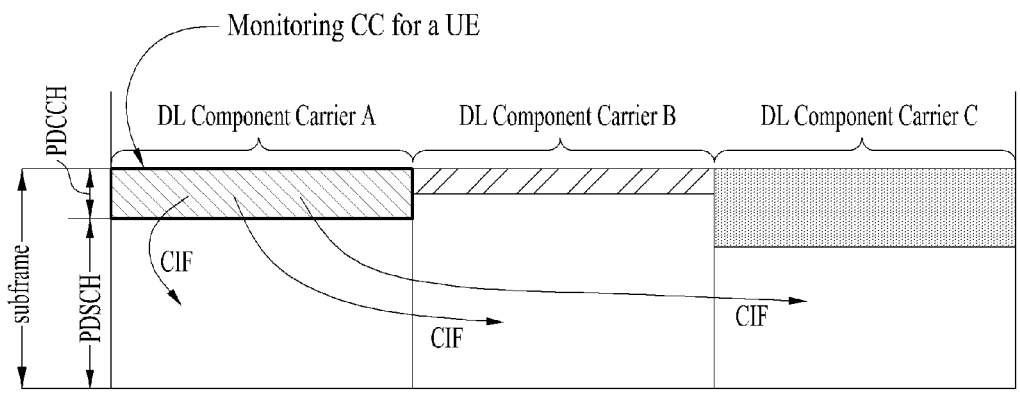
FIG. 8 illustrates a drawing for describing cross-carrier scheduling.

FIG. 8 illustrates a drawing for describing cross-carrier scheduling. Cross-carrier scheduling, for example, refers to all downlink scheduling allocation information of another DL CC being included in the control region of any one DL CC, among multiple serving cells, or all uplink scheduling authorization (or certification) information respective to multiple UL CCs linked to any one DL CC being included in the control region of the one DL CC, among multiple serving cells.

First of all, a carrier indicator field (CIF) will be described in detail.

As described above, the CIF may either be included or not included in the DCI format, which is being transmitted through the PDCCH. And, in case the CIF is included in the DCI format, this indicates that cross-carrier scheduling is applied. In case cross-carrier scheduling is not applied, the downlink scheduling allocation information is valid within the DL CC through which current downlink scheduling allocation information is being transmitted. Additionally, the uplink scheduling authorization is valid for a UL CC, which is linked to the DL CC through which the downlink scheduling allocation information is being transmitted.

In case cross-carrier scheduling is being applied, the CIF indicates a CC related to the downlink scheduling allocation information, which is transmitted through the PDCCH from any one DL CC. For example, referring to FIG. 8, downlink allocation information, i.e., information on PDSCH resource, respective to DL CC B and DL CC C is transmitted through the PDCCH within the control region of DL CC A. The user equipment may monitor DL CC A, so as to figure out the resource area of the PDSCH and the corresponding CC through the CIF.

Whether the CIF is included or not included in the PDCCH may be semi-statically set up, and the CIF may be UE-specifically activated (or enabled) by higher-layer signaling. In case the CIF is disabled, the PDCCH of a specific DL CC allocates PDSCH resource of the same DL CC and may also allocate PUSCH resource of a UL CC, which is linked to the specific DL CC. In this case, the same coding method, CCE based resource mapping, DCI format, and so on, as the legacy PDCCH structure may be applied.

Meanwhile, in case the CIF is enabled, the PDCCH of a specific DL CC may allocate PDSCH/PUSCH resource within a single DL/UL CC being indicated by the CIF, among the multiple aggregated CCs. In this case, a CIF may be additionally defined in the legacy PDCCH DCI format, and the CIF may be defined as a field having a fixed length of 3 bits, or the CIF position may be fixed regardless of the DCI format size. In this case also, the same coding method, CCE based resource mapping, DCI format, and so on, as the legacy PDCCH structure may be applied.

In case the CIF exists, the base station may allocation a DL CC set, which is intended to monitor the PDCCH. Accordingly, the burden of blind decoding of the UE may be decreased. The PDCCH monitoring CC set corresponds to a portion of the entire aggregated DL CC, and the user equipment may perform PDCCH detection/decoding only in the corresponding CC set. More specifically, in order to perform PDSCH/PUSCH scheduling with respect to the user equipment, the base station may transmit the PDCCH only over the PDCCH monitoring CC set. The PDCCH monitoring CC set may be UE-specifically or UE group-specifically or cell-specifically set up. For example, as shown in the example of FIG. 8, when 3 DL CCs are aggregated, DL CC A may be set up as the PDCCH monitoring DL CC. In case the CIF is disabled, the PDCCH of each DL CC may schedule only the PDSCH within the DL CC A. Meanwhile, when the CIF is enabled, in addition to the DL CC A, the PDCCH of DL CC A may also schedule the PDSCH of other DL CCs. In case the DL CC A is set up as the PDCCH monitoring CC, the PDSCCH is not transmitted to DL CC B and the DL CC C.

In a system having the above-described carrier aggregation applied thereto, the user equipment may receive multiple PDSCH through multiple downlink carriers. And, in this case, there may occur a case when the user equipment is required to transmit ACK/NACK respective to each data set from one UL CC within a single subframe. When multiple ACK/NACKs are being transmitted from a single subframe by using PUCCH format 1a/1b, a high transmission power is required, PAPR of an uplink transmission is increased, and, due to an inefficient usage of a transmission power amplifier, the available transmission distance of the user equipment from the base station may be decreased. In order to transmit multiple ACK/NACKs through a single PUCCH, ACK/NACK bundling or ACK/NACK multiplexing may be applied.

Additionally, there may occur a case when ACK/NACK information respective to a large number of downlink data sets according to the application of carrier aggregation and/or ACK/NACK information respective to a large number of downlink data sets being transmitted from a plurality of DL subframes in a TDD system is required to be transmitted through the PUCCH in a single subframe. In such case, if the number if ACK/NACK bits that are to be transmitted is larger than the number of bits available for support through ACK/NACK bundling or multiplexing, the ACK/NACK information may not be correctly transmitted by using the above-described methods.

ACK/NACK Multiplexing Methods

In case of performing ACK/NACK multiplexing, contents of an ACK/NACK response respective to multiple data units may be identified by a combination of an ACK/NACK unit that is actually used in an ACK/NACK transmission and one of multiple QPSK modulated symbols. For example, it will be assumed that one ACK/NACK unit carries information having the size of 2 bits, and that the ACK/NACK unit receives a maximum of 2 data units. Herein, it will be assumed that the HARQ ACK/NACK response respective to each of the received data unit is expressed by using one ACK/NACK bit. In such case, a transmitting end transmitting the data may identify the ACK/NACK result as shown below in Table 4.

TABLE 4

| HARQ-ACK(0), HARQ-ACK(1) | $n_{PUCCH}^{(1)}$ | b(0), b(1) |
|---|---|---|
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |

TABLE 4-continued

| HARQ-ACK(0), HARQ-ACK(1) | $n_{PUCCH}^{(1)}$ | b(0), b(1) |
|---|---|---|
| NACK, DTX | $n_{PUCCH,0}^{(1)}$ | 1, 0 |
| DTX, DTX | N/A | N/A |

In Table 4, HARQ-ACK(i) (i=0, 1) indicates an ACK/NACK result respective to data unit i. As described above, since it is assumed that a maximum of 2 data units (data unit 0 and data unit 1) are received, in Table 4, the ACK/NACK result respective to data unit 0 is expressed as HARQ-ACK(0), and the ACK/NACK result respective to data unit 1 is expressed as HARQ-ACK(1). In Table 4 shown above, DTX (Discontinuous Transmission) indicates that a data unit respective to HARQ-ACK(i) is not being transmitted or that a receiving end is incapable of detecting the presence (or existence) of a data unit respective to HARQ-ACK(i). Additionally, $n_{PUCCH,X}^{(1)}$ represents an ACK/NACK unit that is actually used in the ACK/NACK transmission. In case a maximum of 2 ACK/NACK units exist, the corresponding ACK/NACK units may be expressed as $n_{PUCCH,0}^{(1)}$ and $n_{PUCCH,X}^{(1)}$. Additionally, b(0),b(1), represents the 2 bits being transmitted by the selected ANK/NACK unit. A modulation symbol being transmitted through the ACK/NACK unit is decided in accordance with the b(0),b(1) bit.

For example, in case the receiving end has successfully received and decoded 2 data units (i.e., in case of ACK, ACK in Table 4), the receiving end transmits 2 bits (1, 1) by using $n_{PUCCH,1}^{(1)}$. Alternatively, in case the receiving end receives 2 data units, when decoding (or detection) of the first data unit (i.e., data unit 0 respective to HARQ-ACK(0)) has failed, and when decoding of the second data unit (i.e., data unit 1 respective to HARQ-ACK(1)) has been successfully performed (i.e., in case of NACK/DTX, ACK in Table 4), the receiving end transmits 2 bits (0, 0) by using $n_{PUCCH,1}^{(1)}$.

As described above, by linking or mapping an ACK/NACK unit selection and a combination of actual bit contents of a transmitted ACK/NACK bit (i.e., a combination of any one of $n_{PUCCH,0}^{(1)}$ and $n_{PUCCH,1}^{(1)}$ and b(0),b(1) in Table 4) to the contents of an actual ACK/NACK, ACK/NACK information respective to multiple data units may be transmitted by using a single ACK/NACK unit. By extending the principles of the above-described ACK/NACK multiplexing, ACK/NACK multiplexing respective to more than 2 data units may be easily realized.

In such ACK/NACK multiplexing method, when at least one ACK basically exists with respect to each of the data units, NACK and DTX may not be identified (or differentiated) from one another (i.e., as expressed as NACK/DTX in Table 4, NACK and DTX may be coupled). This is because the ACK/NACK states (i.e., ACK/NACK hypotheses), which may occur when NACK and DTX are to be differently expressed, cannot all be reflected by using only a combination of an ACK/NACK unit and a QPSK-modulated symbol. Meanwhile, when an ACK does not exist with respect to all data units (i.e., when only NACK or DTX exist with respect to all data units), a case of having one certain NACK indicating that only one of the multiple HARQ-ACK(i)s is certainly a NACK (i.e., a NACK being differentiated from a DTX) may be defined. In this case, an ACK/NACK unit respective to a data unit corresponding to the one certain NACK may be reserved for transmitting signals of multiple ACK/NACKs.

Semi-Persistent Scheduling (SPS)

DL/UL SPS (semi-persistent scheduling) first designates to the UE from which subframes the SPS is to be transmitted/received (based upon subframe cycle and offset) via RRC (Radio Resource Control) signaling, and then the actual activation and release of the SPS is performed through the PDCCH. More specifically, even if the UE is allocated with the SPS via RRC signaling, instead of immediately performing SPS TX/RX, when a PDCCH notifying the activation (or reactivation) is received (i.e., when a PDCCH having an SPS C-RNTI detected therefrom is received), the SPS operation may be performed accordingly. More specifically, when an SPS activation PDCCH is received, a frequency resource is allocated in accordance with RB allocation designated by the received PDCCH, and modulation and coding rate respective to MCS information are applied, so that the TX/RX can be initiated by using the subframe cycle and offset, which are allocated via RRC signaling. Meanwhile, when a PDCCH notifying SPS release is received, the user equipment (UE) stops performing TX/RX. After the SPS TX/RX is stopped, once a PDCCH notifying the activation (or reactivation) is received, the TX/RX may be continued by using the subframe cycle and offset, which are allocated via RRC signaling, in accordance with the RB allocation, MCS, and so on, which are designated by the received PDCCH.

In the PDCCH format, which is currently defined in the 3GPP LTE, diverse formats are defined, such as DCI format 0, which is specified for uplink, and DCI formats 1, 1A, 1B, 1C, 1D, 2, 2A, 3, 3A, and so on, which are specified for downlink, and control information, such as Hopping flag, RB allocation, MCS (modulation coding scheme), RV (redundancy version), NDI (new data indicator), TPC (transmit power control), Cyclic shift DMRS (demodulation reference signal), UL index, CQI (channel quality information) request, DL assignment index, HARQ process number, TPMI (transmitted precoding matrix indicator), PMI (precoding matrix indicator) confirmation, are transmitted in the form of selected combination.

More specifically, a case of using the PDCCH for the purpose of SPS scheduling activation/release may be validated by having the CRC of the DCI being transmitted through the PDCCH masked with an SPS C-RNTI, and by setting NDI to 0 (NDI=0). At this point, the SPS activation may be used as a virtual CRC by setting a combination of the bit field to 0, as shown below in Table 5.

TABLE 5

|  | DCI format 0 | DCI format 1/1A | DCI format 2/2A/2B |
| --- | --- | --- | --- |
| TPC command for scheduled PUSCH | set to '00' | N/A | N/A |
| Cyclic shift DMRS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |

TABLE 5-continued

|  | DCI format 0 | DCI format 1/1A | DCI format 2/2A/2B |
| --- | --- | --- | --- |
| Redundancy version | N/A | set to '00' | For the enabled transport block: is set to '00' |

When an error that cannot even be verified by the CRC occurs, by verifying whether or not the corresponding bit field value corresponds to a prearranged value, the virtual CRC provides additional error detection capability. When a error occurs in a DCI, which is assigned (or allocated) to another UE, yet when the specific UE is incapable of detecting the corresponding error and misinterprets (or misrecognizes) the corresponding error as its own SPS activation, since the corresponding resource is continuously used, one error may cause a permanent problem. Therefore, by using a virtual CRC, incorrect detection of SPS may be prevented.

In case of SPS cancellation, the bit field values may be set as shown below in Table 6 and used as virtual CRC.

TABLE 6

|  | DCI format 0 | DCI format 1A |
| --- | --- | --- |
| TPC command for scheduled PUSCH | set to '00' | N/A |
| Cyclic shift DMRS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | set to all '1's |

Heterogeneous Network Environment (Heterogeneous Deployments)

FIG. 9 illustrates a drawing showing a heterogeneous network including a macro base station (MeNB) and a micro base station (PeNB or FeNB). In this document, the term heterogeneous network signifies a network having a macro base station (MeNB) and a micro base station (PeNB or FeNB) co-existing therein even if the same RAT (Radio Access Technology) is being used.

The macro base station (MeNB) has a wide coverage and a high transmission power and signifies a general base station of a wireless communication system. The macro base station (MeNB) may also be referred to as a macro cell.

The micro base station (PeNB or FeNB) may also be referred to as, for example, a micro cell, a pico cell, a femto cell, a home eNB (HeNB), a relay, and so on (the exemplary micro base station and macro base station may also be collectively referred to as a transmission point). As a compact version of the macro base station (MeNB), the micro base station (PeNB or FeNB) may perform most of the functions of the macro base station and may be operated independently, and the macro base station corresponds to a type of base station that may be installed (overlay) in an area covered by the macro base station, or that may be installed (non-overlay) in a shadow area that cannot be covered by the macro base station. As compared to the macro base station (MeNB), the micro base station (PeNB or FeNB) has a narrower coverage and a lower transmission power and may accommodate a smaller number of user equipments.

The user equipment may directly receive service from the macro base station (MeNB) (hereinafter referred to as a macro user equipment (macro-UE)), and the user equipment may also receive service from the micro base station (PeNB or FeNB) (hereinafter referred to as a micro user equipment (micro-UE)). In some cases, a user equipment (PUE) existing within the coverage of the micro base station (MeNB) may receive service from the macro base station (MeNB).

The micro base station may be divided into two different types in accordance with whether or not the user equipment has limited access.

The first type corresponds to an OSG (Open access Subscriber Group) or non-OSG (Closed access subscriber Group) base station, which refers to a cell allowing access of a legacy macro-UE or a micro-UE of another micro base station. The legacy macro-UE, and so on, may be processed with handover (or may be handed over) to an OSG type base station.

The second type corresponds to a CSG base station, which does not allow access of a legacy macro-UE or a micro-UE of another micro base station. Thus, handover to the CSG base station cannot be performed.

Inter-Cell Interference Cancellation (ICIC)

In a heterogeneous network environment, as described above, interference between neighboring cells may cause problems. In order to resolve such inter-cell interference, Inter-Cell Interference Cancellation (ICIC) may be applied. The legacy ICIC may be applied with respect to frequency resources or with respect to time resources.

As an example of an ICIC respective to frequency resources, in a 3GPP LTE release-8 system, a given whole frequency domain (e.g., system bandwidth) is divided into one or more sub-regions (e.g., physical resource block (PRB) units), and a method for exchanging ICIC messages with respect to each of the frequency sub-regions between the cells is defined. For example, as information included in an ICIC message respective to frequency resources, an RNTP (Relative Narrowband Transmission Power) related to downlink transmission power is defined, and UL IOI (Interference Overhead Indication), UL HII (High Interference Indication), and so on, which are related to uplink interference, are defined herein.

The RNTP corresponds to information indicating downlink transmission power used in a specific frequency sub-region by a cell transmitting the ICIC message. For example, when an RNTP field respective to a specific frequency sub-region is set to have a first value (e.g., 0), this may indicate that the downlink transmission power of the corresponding cell does not exceed a predetermined threshold value within the corresponding frequency sub-region. Alternatively, when an RNTP field respective to a specific frequency sub-region is set to have a second value (e.g., 1), this may indicate that the corresponding cell cannot make any prearrangements respective to the downlink transmission power in the corresponding frequency sub-region. In other words, when the RNTP field value is assigned with 0, it may be assumed that the downlink transmission power of the corresponding cell is low in the corresponding frequency sub-region. However, when the RNTP field value is assigned with 1, it cannot be assumed that the downlink transmission power of the corresponding cell is low in the corresponding frequency sub-region.

UL IOI corresponds to information indicating an amount (or size) of uplink interference experienced (or received) by the cell transmitting the ICIC message in a specific frequency sub-region. For example, the fact that an IOI field respective to the specific frequency-sub-region is set to a value corresponding to a large interference amount may indicate that the corresponding cell is experiencing intense uplink interference in the corresponding frequency sub-region. In a frequency sub-region corresponding to an IOI indicating intense uplink interference, a cell receiving the ICIC message may schedule a user equipment using low uplink transmission power, among the user equipments served by the corresponding cell. Accordingly, since user equipments perform uplink transmission by using low transmission power in a frequency sub-region corresponding to the IOI, which indicates intense uplink interference, the uplink interference experienced by a neighboring cell (i.e., the cell transmitting the ICIC message) may be mitigated.

UL HII corresponds to information indicating a level of interference (or uplink interference sensitivity), which may be caused by an uplink transmission of a cell transmitting the ICIC message with respect to the corresponding frequency sub-region. For example, when an HII value is set to have a first value (e.g., 1) with respect to a specific frequency sub-region, this may indicate that the cell transmitting the ICIC message is highly likely to schedule a user equipment having a strong uplink transmission power with respect to the corresponding frequency sub-region. Conversely, when an HII value is set to have a second value (e.g., 0) with respect to a specific frequency sub-region, this may indicate that the cell transmitting the ICIC message is highly likely to schedule a user equipment having a weak uplink transmission power with respect to the corresponding frequency sub-region. Meanwhile, the cell receiving the ICIC message may first schedule a user equipment in a frequency sub-region having the HII value set to a second value (e.g., 0), and, then, the cell receiving the ICIC message may schedule user equipments that can operate well even under intense interference in a frequency sub-region having the HII value set to a first value (e.g., 1). Accordingly, by doing so, interference from the cell transmitting the ICIC message may be avoided.

Meanwhile, as an example of an ICIC respective to time resources, in a 3GPP LTE-A (or 3GPP LTE release-10) system, a given whole time domain is divided into one or more sub-regions (e.g., subframe units) within a frequency, and a method for exchanging information on the presence or absence of silencing with respect to each of the time sub-regions between the cells is defined. The cell transmitting the ICIC message may deliver information indicating that silencing is being performed to neighboring cells from a specific subframe, and the cell does not schedule a PDSCH or PUSCH in the corresponding subframe. Meanwhile, a cell receiving the ICIC message may schedule uplink and/or downlink transmission respective to a user equipment within a subframe, wherein silencing is performed by the cell transmitting the ICIC message.

Silencing may refer to an operation performed by a specific cell, wherein the cell does not perform most of the signal transmission via uplink and downlink within a specific subframe (or wherein the cell performs transmission with 0 or low power). As an example of silencing, a specific ell may set up a specific subframe as an ABS (Almost Blank Subframe, ABS). As shown in FIG. 6, the ABS may be divided into two difference types. More specifically, there may exist a case when a data region is left empty even though a Cell specific Reference Signal (CRS) is being transmitted (ABS in normal subframe) and a case when even the CRS is not transmitted (ABS in MBSFN subframe). In case of the ABS in normal subframe, influence of the interference caused by the CRS may exist more or less. Therefore, in light of the interference, the ABS in MBSFN subframe may be more or less advantageous. However, since its usage is limited, both types of ABS may be alternately used.

Figure 10:
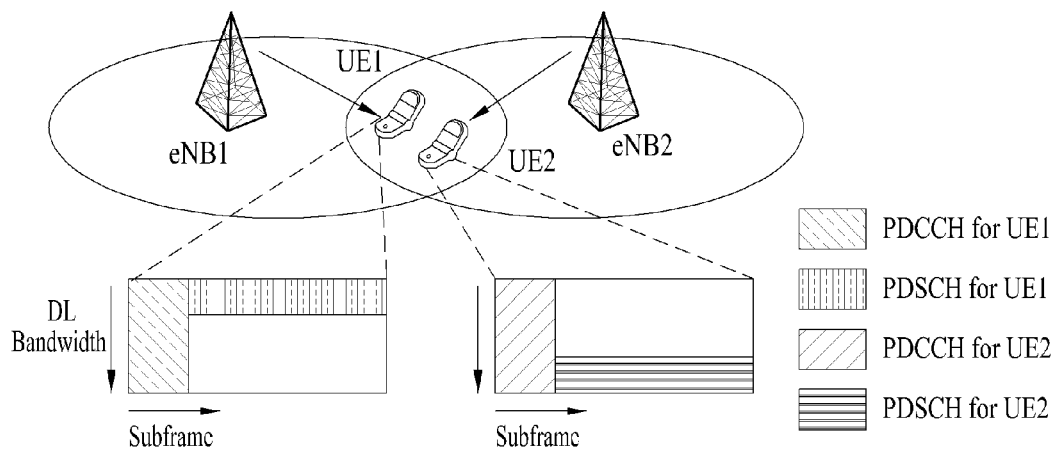
FIG. 10 to FIG. 11 respectively illustrates a method for mitigating interference via scheduling in a heterogeneous network.

As a method that may be used when scheduling information is exchanged between each base station, FIG. 10 illustrates a method for mitigating interference by assigning a PDSCH to a frequency domain, which is orthogonal to user equipments located in cell boundary regions. However, as described above, due to the fact that the PDCCH is being transmitted throughout the entire downlink bandwidth, the PDCCH is disadvantageous in that it cannot mitigate interference. For example, since a time-frequency region, wherein a PDDCH is being transmitted from eNB1 to UE1, overlaps with a time-frequency region, wherein a PDDCH is being transmitted from eNB2 to UE2, the PDCCH transmission respect to each of UE1 and UE2 may interfere with one another.

Figure 11:
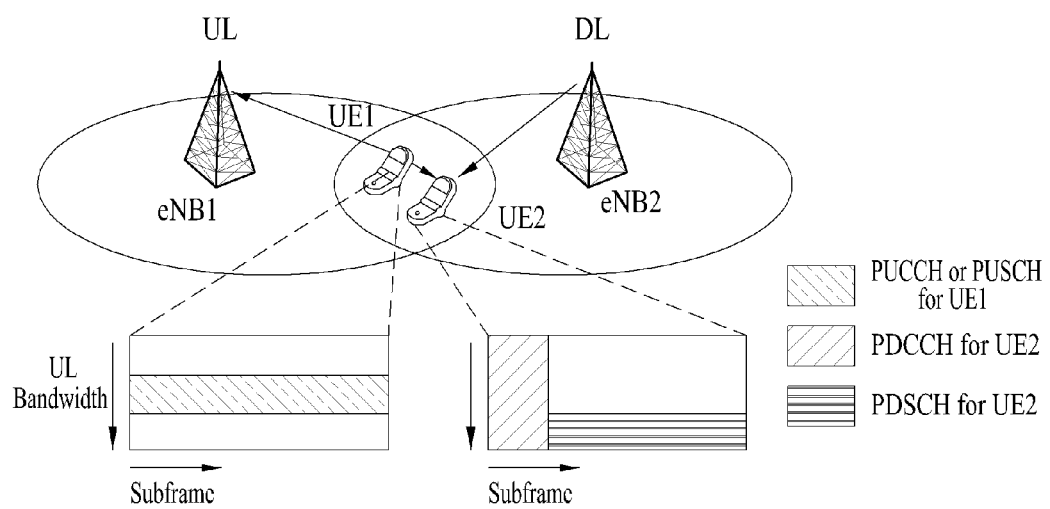

Additionally, as shown in FIG. 11, the PUCCH or PUSCH transmitted by UE1 may act as interference on the PDCCH or PDSCH that is to be received by a neighboring UE2. In this case also, when scheduling information is exchanged between base stations, the interference caused on the PDSCH may be avoided by allocating the user equipments to an orthogonal frequency domain. However, the PDCCH may still be influenced with interference caused by the PUCCH or PUSCH, which is transmitted by UE1.

For the above-described reasons, discussions are being made on the adoption of an ePDCCH other than the current PDCCH. Evidently, in addition to interference, the purpose of the ePDCCH also lies in effectively supporting CoMP (Coordinated Multipoint Transmission), MU-MIMO (Multiuser-Multi input Multi Output).

In case ePDCCH is being adopted, although the above-described DCI formats, which are used in the legacy LTE/LTE-A, may be directly used without modification, the adoption of a new DCI format may also be considered. Evidently, in addition to the ePDCCH region, the newly configured DCI format may also be transmitted from the legacy PDCCH. As the above-described new DCI format, the present invention proposes a joint DCI format, wherein two or more DCI formats are connected/concatenated to one another.

Although it will be described later on in more detail, according to a general description, the legacy DCI formats or a new DCI format may be included in the DCI format, which is being transmitted for each user equipment, and which is included in the joint DCI format proposed herein. A new DCI format may be defined and may then be configured into a joint DCI format for multiple user equipments, and, then, the configured joint DCI format may be transmitted. For example, DCI format 5 may be defined as the new DCI format for the joint DCI format. The newly defined DCI format 5 may be configured by reducing the payload size after removing an information field when required or by newly adding a required information field from/to the DCI formats defined in the legacy LTE/LTE-A.

The user equipments receiving the joint DCI format may be set up to use the same DCI formats or each of the user equipments may be set up to use different DCI formats. Such information on whether or not the same DCI format is being used may be transmitted via RRC signaling or may be pre-defined in advance. Additionally, the related information may be dynamically transmitted. In case the usage of the same transmission mode is set up for two user equipments via RRC signaling, under the assumption that two user equipments are required to use the same DCI format, each user equipment may perform blind decoding on two DCI formats. For the user equipments received the joint DCI format, the same transmission mode may be set up for the corresponding user equipments, or the transmission may be non-identically set up without limitation.

Configuration of Joint DCI

Figure 12:
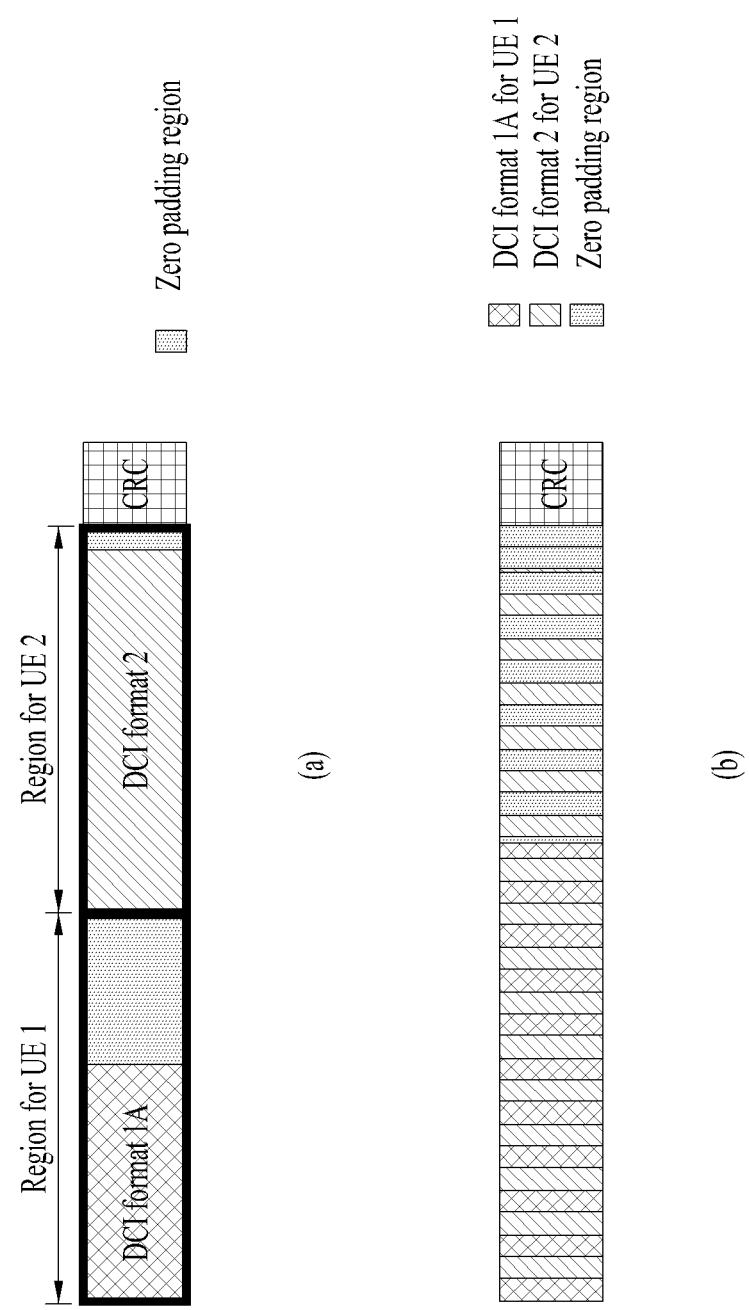
FIG. 12 to FIG. 13 illustrate drawings for describing joint downlink control information formats according to an exemplary embodiment of the present invention.
Figure 13:
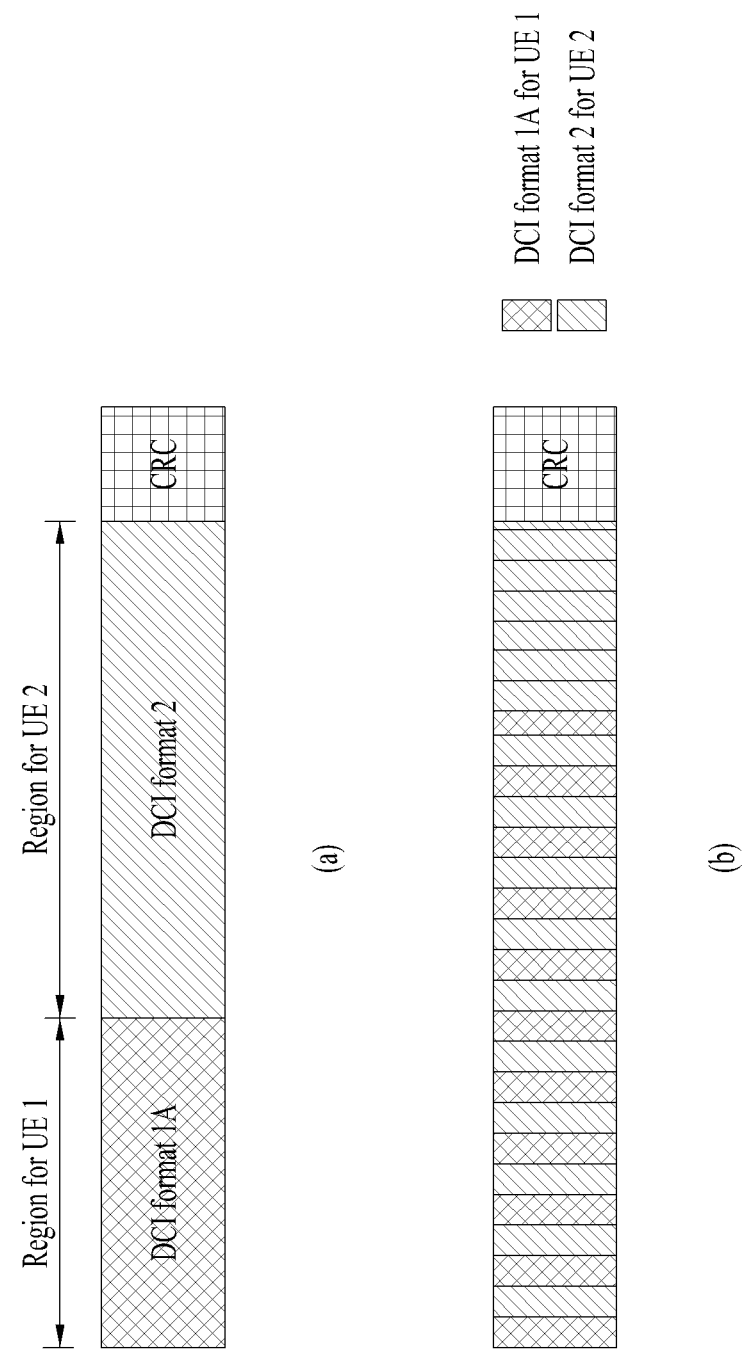

FIG. 12 to FIG. 13 illustrate drawings for describing joint downlink control information formats according to an exemplary embodiment of the present invention. FIG. 12 shows a structure of a case when the size of the joint DCI format is limited to a predetermined size, and FIG. 13 shows a structure of a case when the size of the joint DCI format is not limited.

FIG. 12(a) shows an exemplary case when the size of the joint DCI format is pre-decided and when two DCI formats are included in the joint DCI format. In the joint DCI format, the first DCI format may be designated to user equipment 1 (UE1), and the second DCI format may be designated for user equipment 2 (UE2). And, the number of DCI formats, the DCI format types (DCI format 1A and DCI format 2), and so on, shown to be included in the joint DCI format are merely exemplary, and other DCI formats may be included based upon the transmission mode, and, as described above, a new DCI format may also be included.

Subsequently, as shown in FIG. 12(a), the size of the joint DCI format is pre-defined in advance, and the size may be decided based upon a maximum size of a DCI format that can be included in the joint DCI format. Accordingly, as shown in the drawing, 2 DCI formats may be included in the joint DCI format, and zero padding may be performed in the remaining region. Herein, the predetermined size for each of the two DCI formats may be identical to one another, or the size of each DCI format may be different from one another.

As described above, in case the size of the joint DCI format is pre-decided in advance, it will be advantageous in that the starting point at which the user equipment is required to perform blind decoding for its DCI format is consistent regardless of the DCI format type included in the joint DCI format. However, as described above, since zero padding is required to be performed, it may be disadvantageous in the aspect of efficient usage of resources. In this case, the size of the joint DCI format may be pre-defined in accordance with the transmission mode.

FIG. 12(b) illustrates DCI format included in the joint DCI format, which is described above in FIG. 12(a), being interleaved with one another by REG units. Such information on whether or not interleaving is being performed may be notified by using RRC signaling, a new DCI format, and so on. In case interleaving is applied, a stronger robustness may be provided against the channel environment in accordance with the resource allocation.

FIG. 13 illustrates an example of a case when the size of the joint DCI format is not pre-decided. In other words, FIG. 13 shows an exemplary case when the size of the joint DCI format is decided in accordance with the type of the DCI format included in the joint DCI format.

Referring to FIG. 13(a), as an example, two DCI formats (DCI format 1A, DCI format 2) for each of two user equipments (UE1, UE2) are included in the joint DCI format. Unlike the example shown in FIG. 12, it may be known that the size of the joint DCI format is decided by the DCI formats, DCI format 1A, DCI format 2, which are included in the joint DCI format. Evidently, in case DCI formats (e.g., DCI format 2, DCI format 2C) other than the DCI formats shown in the drawing are included in the joint DCI format, the size of the joint DCI format may be decided in accordance with the corresponding DCI formats. Additionally, although it is shown in FIG. 13(a) that each DCI format (DCI format 1A, DCI format 2) is designated for each user equipment (UE1, UE2), one or more DCI format may be designated for one or more user equipments. For example, DCI format 1A may be designated for user equipment 1 and user equipment 2.

FIG. 13(*b*) illustrates DCI format included in the joint DCI format, which is described above in FIG. 13(*a*), being interleaved with one another by REG units. Such information on whether or not interleaving is being performed may be notified by using RRC signaling, a new DCI format, and so on. In case interleaving is applied, a stronger robustness may be provided against the channel environment in accordance with the resource allocation.

Two or more DCI formats, which are designated for two or more user equipments, and which are included in the above-described joint DCI format, may be limited to be dependent on the transmission mode. For example, in case DCI formats for user equipment 1 and user equipment 2 are included in the joint DCI format, the DCI formats that may correspond to such DCI formats may be the formats respective to the transmission mode set up for user equipment 1 and user equipment 2. Furthermore, when the transmissions set up for user equipment 1 and user equipment 2 are different, whenever possible, settings may be made, so that, among the diverse DCI formats respective to the transmission mode, only two different types of DCI formats can be included in the joint DCI format. In such case, the number of blind decoding sessions that are to be performed by the user equipment may be reduced.

CRC (Cyclic Redundancy Check) Attached to Joint DCI Format

Referring back to FIG. 12 and FIG. 13, it can be known that CRC is attached to the joint DCI format. The CRC being attached to the joint DCI format may correspond to a radio network temporary identifier (RNTI), which is shared by two or more user equipments that are scheduled to decode the DCI format included in the joint DCI format. In this case, a group-RNTI, which is shared by the two user equipments having the usage of the joint DCI format set up (or determined) therein, should be notified in advance to the user equipment. Such information may also be notified through RRC signaling or through a new DCI format transmitting information on the joint DCI format of the two user equipments. At this point, 16 bits may be used for the length of the CRC that is being transmitted, just as in the legacy LTE/LTE-A. Alternatively, for better robustness, the CRC may be provided with a longer length, or the size of the joint DCI format may be reduced by using a shorter length. More specifically, the length of the CRC may be decided based upon the channel environment, position within the cell, interference status, and so on, of the user equipment that is to receive the joint DCI format.

Information for Joint DCI Decoding

In the above-described joint DCI format, information required for the user equipment to perform blind decoding on its DCI format may include the following.

First of all, in case a number of user equipments capable of receiving DCI formats is designated and a size of the joint DCI format is decided in advance through the joint DCI format, information on an index of the DCI format for the corresponding user equipment may be included. For example, when a joint DCI format is used for two user equipments, bit information is additionally transmitted to each user equipment, so as to be capable of notifying the position of the DCI format for the respective user equipment. In case a number of user equipments capable of receiving DCI formats is designated and a size of the joint DCI format is not decided in advance, information on a starting point (or position) of each DCI format included in the joint DCI format is required to be additionally transmitted. This may be replaced by notifying the type of each DCI format included in the joint DCI format.

Subsequently, in case the number of user equipments capable of receiving DCI formats through the joint DCI format is variable, in other words, in case the number of user equipments capable of receiving DCI formats included in the joint DCI format is variable, the number such DCI formats may be included in the information for performing blind decoding along with the above-described information. In case the size of the joint DCI format is defined in advance, the region of the region to which each of the user equipments can perform transmission may vary in accordance with the number of user equipments receiving the DCI format. In case the size of the joint DCI format is not defined in advance, information on the DCI formats transmitted to other user equipments should be known.

The information required for performing blind decoding on the joint DCI format may be transmitted via RRC signaling, or the information may be transmitted for a newly defined DCI format, which notifies such information.

Joint DCI Format and Transmission Mode

The DCI formats included in the above-described joint DCI format and the respective transmission modes may include i) a legacy transmission mode and a legacy DCI format, ii) a legacy transmission mode and a new DCI format, iii) a new transmission mode and a legacy DCI format, and iv) a new transmission mode and a new DCI format. Hereinafter, each of the above will be described in detail.

i) Legacy Transmission Mode and Legacy DCI Format

In a specific transmission mode, wherein transmission is received via RRC signaling, the user equipment may receive a joint DCI format, which is configured of the legacy (or conventional) DCI formats. In this case, the user equipment may use the same DCI format as other user equipments, which are simultaneously scheduled as the corresponding user equipment, the corresponding user equipment may use DCI formats other than the other user equipments. Information on whether the user equipments use the same DCI formats or whether the user equipments use different DCI formats may be notified by using RRC signaling or a new DCI format.

In case the two user equipments use the same DCI formats, each of the user equipments may perform blind decoding to a DCI format size having a payload size (excluding CRC) that corresponds to two times the size of two candidate DCI formats, which are defined in a specific transmission mode received via RRC signaling. For example, when the user equipments are set up to use transmission mode 2, DCI format 1A and DCI format 1 may be transmitted, and, herein, in case the user equipments are set up to use the joint DCI format, and in case the two user equipments use the same DCI format, the two user equipments may detect the DCI format being transmitted to the user equipment by performing blind decoding. Alternatively, the DCI formats used by the two user equipments may be directly notified by using RRC signaling.

Alternatively, depending upon the transmission mode, the payload size in the joint DCI format may be defined in advance. Depending upon the transmission mode, the user equipments may perform blind decoding to a pre-defined payload size.

In case the two user equipments use different DCI formats, each of the two user equipments may receive a transmission mode transmitted via RRC signaling. Since two DCI format candidates exist in one transmission mode, a maximum of 4 different candidates may be generated in the two user equipments. In this case, since the number of blind decoding sessions performed by the user equipment may be increased, the number of DCI format candidates may be limited. The DCI formats used by the two user equipments may be directly notified by using RRC signaling. For example, in case a maximum of 4 different types can be used, information on which DCI format type has been used by the two user equipments may be notified by using 2 bits. Alternatively, a case when DCI format candidates can be used by the two user equipments may be notified, or a case when DCI formats that cannot be used by the two user equipments may also be notified.

ii) Legacy Transmission Mode and New DCI Format

In a specific transmission mode, which is received via RRC signaling, when using newly defined DCI format candidates, the two user equipments may use the same DCI formats or may use different DCI formats.

For example, when the CRC of two user equipments are scrambled in a Group-RNTI, and when the usage of Transmission Mode 2 is set up via RRC signaling, although it was conventionally defined that DCI formats 1A and 1 are transmitted, DCI format 5 may also be additionally defined. When a joint DCI format is defined for two user equipments, DCI format 5 may correspond to a DCI format, which is newly defined by removing unnecessary information bits from the conventional (or legacy) DCI format or by adding additionally required information bits to the conventional (or legacy) DCI format. Such DCI format 5 may be set up to perform blind decoding only in the case of a user equipment being set up with the joint DCI format. This method may be used both in the case when two user equipments use the same DCI format and in the case when two user equipments use different DCI formats.

iii) New Transmission Mode and Legacy DCI Format

In a new transmission mode received via RRC signaling, when two user equipments reuse the legacy (or conventional) DCI format, the two user equipments may use the same DCI format or may use different user equipments. In this case, the usage of the new transmission mode may be considered as the usage of a joint DCI format being set up. Alternatively, the usage of the joint DCI format may be set up by RRC signaling.

For example, in the new transmission mode, when it is defined that DCI formats 1A and 2 are being transmitted, and when the two user equipments use the same DCI formats, the two user equipments may identically use DCI format 1A or may identically use DCI format 2. When the usage of the joint DCI format is set up, and when the two user equipments use the same DCI format, the two user equipments may detect the DCI format being transmitted to the user equipments by performing blind decoding. Alternatively, the DCI formats used by the two user equipments may be directly notified by using RRC.

As another example, in case the two user equipments use different DCI formats, a case when the two user equipments use the DCI formats by the order of DCI formats 1A and 2 may become a candidate. In this case, since the number of blind decoding sessions performed by the user equipment may be increased, the number of candidate cases may be limited. The DCI formats used by the two user equipments may be directly notified by using RRC signaling. For example, in case a maximum of 4 different types can be used, information on which DCI format type has been used by the two user equipments may be notified by using 2 bits. Alternatively, a case when DCI format candidates can be used by the two user equipments may be notified, or a case when DCI formats that cannot be used by the two user equipments may also be notified.

iv) New Transmission Mode and New DCI Format

In a specific transmission mode, which is received via RRC signaling, when using newly defined DCI format candidates, the two user equipments may use the same DCI formats or may use different DCI formats. In this case, the usage of the new transmission mode may be considered as the usage of a joint DCI format being set up. Alternatively, the usage of the joint DCI format may be set up by RRC signaling.

For example, DCI format 5 and DCI format 6 may each be defined as a DCI format, which is newly defined by removing unnecessary information bits from the conventional (or legacy) DCI format or by adding additionally required information bits to the conventional (or legacy) DCI format. In a newly defined transmission mode, DCI format 5 and DCI format 6 may be defined as candidates that can be transmitted. When the two user equipments use the same DCI formats, the two user equipments may identically use DCI format 5 or may identically use DCI format 6. When the usage of the joint DCI format is set up, and when the two user equipments use the same DCI format, the two user equipments may detect the DCI format being transmitted to the user equipments by performing blind decoding. Alternatively, the DCI formats used by the two user equipments may be directly notified by using RRC.

As another example, in case the two user equipments use different DCI formats, a maximum of 4 different cases may be generated, wherein the 4 different cases consist of DCI format candidates that can be transmitted in the transmission mode, which is used by each user equipment. In this case, since the number of blind decoding sessions performed by the user equipment may be increased, the number of candidate cases may be limited. The DCI formats used by the two user equipments may be directly notified by using RRC signaling. For example, in case a maximum of 4 different types can be used, information on which DCI format type has been used by the two user equipments may be notified by using 2 bits. Alternatively, a case when DCI format candidates can be used by the two user equipments may be notified, or a case when DCI formats that cannot be used by the two user equipments may also be notified.

Unlike the description provided above, information on whether the DCI format of each user equipment is being used or whether the joint DCI format is being used may be set up by using RRC signaling or a new DCI format regardless of the transmission mode. For example, in case the bit indicating whether or not the two user equipments use the joint DCI format corresponds to 1, it may be indicated that the joint DCI format is being used via RRC signaling. At this point, in case the legacy DCI format is being used, information on which DCI format has been allocated to the user equipment may be notified by using a bitmap of DCI formats 0-4.

Transmission Channel/Transmission Scheme of a Joint DCI Format

The joint DCI format may be transmitted from a legacy PDCCH or ePDCCH region. In each case, CSS and/or USS may be used. In case transmission is performed by using the CSS, since all user equipments perform blind decoding, it may be disadvantageous in that the number of blind decoding sessions that are to be performed by the user equipments can be increased. In case transmission is performed by using the USS, since two user equipments are required to perform the search process simultaneously, a common (or shared) RNTI (group-RNTI) may be applied.

Such joint DCI format may be transmitted for neighboring user equipments of several individuals, and such joint DCI format may be transmitted by using SU-MIMO (single user-MIMO). Since user equipments located in geographically neighboring positions have similar channel status, the same PMI may be used. And, therefore, such application may become possible. In case of using SU-MIMO as described above, both the Closed loop scheme and the Open loop scheme may be used. For example, precoding, beamforming, transmission diversity (e.g., SFBC, STBC, AS, PVS) or spatial diversity or frequency diversity may be applied. As the open loop scheme, CDD (cyclic delay diversity) or random beamforming may be used. The joint DCI format may be transmitted through a single layer or may be transmitted by using two layers via the MIMO scheme.

Figure 14:
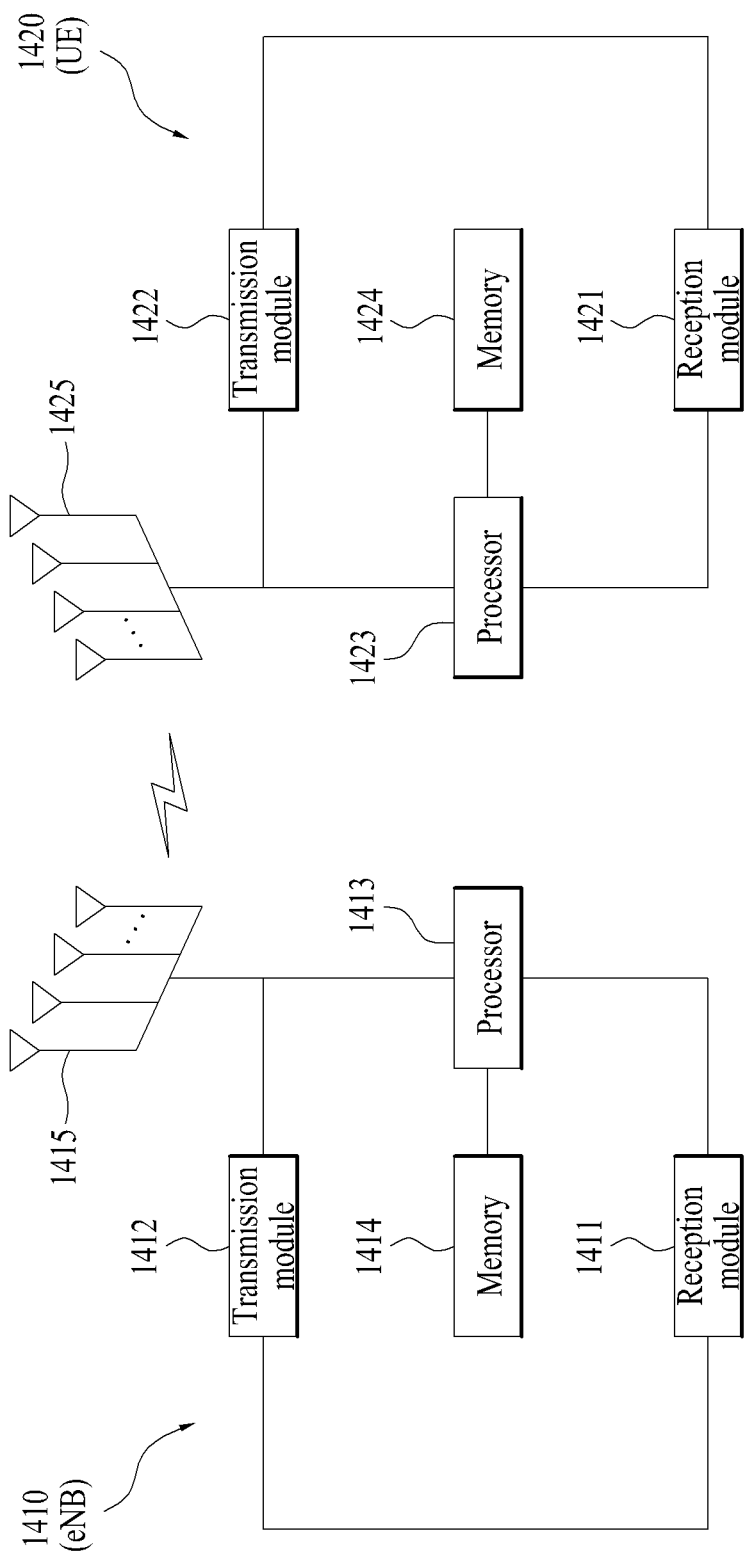
FIG. 14 illustrates structures of a base station device and a user equipment device according to an exemplary embodiment of the present invention.

FIG. 14 illustrates structures of a base station device and a user equipment device according to an exemplary embodiment of the present invention.

Referring to FIG. 14, the base station device (1410) according to the present invention may include a reception module (1411), a transmission module (1412), a processor (1413), a memory (1414), and multiple antennae (1415). The multiple antennae (1415) indicate that the base station device supports MIMO transmission/reception (or transception). The reception module (1411) may receive diverse signals, data, and information within an uplink from the user equipment. The transmission module (1412) may transmit diverse signals, data, and information within a downlink to the user equipment. The processor (1413) may control the overall operations of the base station device (1410).

The processor (1413) of the base station device (1410) according to an exemplary embodiment of the present invention may process the diverse exemplary embodiments, which are described above.

Moreover, in addition to the above-described functions, the processor (1413) of the base station device (1410) may perform functions of performing calculation operations of information received by the base station device (1410), information that is to be transmitted to an external target, and so on. And, the memory (1414) may store the calculated information for a predetermined period of time, and the memory (1414) may also be replaced with another element, such as a buffer (not shown).

Additionally, referring to FIG. 14, the user equipment device (1420) according to the present invention may include a reception module (1421), a transmission module (1422), a processor (1423), a memory (1424), and multiple antennae (1425). The multiple antennae (1425) indicate that the base station device supports MIMO transmission/reception (or transception). The reception module (1421) may receive diverse signals, data, and information within a downlink from the base station. The transmission module (1422) may transmit diverse signals, data, and information within an uplink to the base station. The processor (1423) may control the overall operations of the user equipment device (1420).

The processor (1423) of the user equipment device (1420) according to an exemplary embodiment of the present invention may process the diverse exemplary embodiments, which are described above.

In addition to the above-described functions, the processor (1423) of the user equipment device (1420) may perform functions of performing calculation operations of information received by the user equipment device (1420), information that is to be transmitted to an external target, and so on. And, the memory (1424) may store the calculated information for a predetermined period of time, and the memory (1424) may also be replaced with another element, such as a buffer (not shown).

The detailed structure of the base station device and the user equipment device, as described above, may be implemented by independently applying the detailed described in diverse exemplary embodiments of the present invention or may be implemented by simultaneously applying 2 or more exemplary embodiments of the present invention. And, for clarity in the description, overlapping contents will be omitted.

Additionally, in the description on FIG. 14, the description on the base station device (1410) may also be equally applied to a device operating as a downlink transmitting subject or an uplink receiving subject, and the description on the user equipment device (1420) may also be equally applied to a relay device operating as a downlink receiving subject or an uplink transmitting subject.

The above-described embodiments of the present invention may be implemented by using a variety of methods. For example, the embodiments of the present invention may be implemented in the form of hardware, firmware, or software, or in a combination of hardware, firmware, and/or software.

In case of implementing the embodiments of the present invention in the form of hardware, the method according to the embodiments of the present invention may be implemented by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory unit may be located inside or outside of the processor, and the memory unit may transmit and receive data to and from the processor by using a wide range of methods that have already been disclosed.

The detailed description of the preferred embodiments of the present invention disclosed herein as described above is provided so that those skilled in the art can easily implement and realize the present invention. Although the embodiment of the present invention has been described with reference to the accompanying drawings, the described embodiment of the present invention is merely exemplary. Therefore, it will be apparent to those skilled in the art that various modifications and variations can be made in the present invention without departing from the spirit or scope of the inventions. For example, anyone skilled in the art may combine each component disclosed in the description of the embodiments of the present invention. Therefore, it is intended that the present invention covers the modifications and variations of this invention provided they come within the scope of the appended claims and their equivalents, and it is not intended to limit the present invention only to the examples presented herein.

Furthermore, the present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein. Furthermore, claims that do not have any explicit citations within the scope of the claims of the present invention may either be combined to configure another embodiment of the present invention, or new claims may be added during the amendment of the present invention after the filing for the patent application of the present invention.

INDUSTRIAL APPLICABILITY

Although the above-described specification has been described based upon a formation that can be applied to a 3GPP LTE group module communication system, the present invention may be identically used in other diverse mobile communication systems or may be used as an equivalent principle.

What is claimed is:

1. A method of a user equipment for acquiring control information in a wireless communication system, the method comprising:
   receiving, by the user equipment, a joint downlink control information (DCI) format including a plurality of DCI formats,
   wherein each of the plurality of DCI formats is associated with each of a plurality of user equipments, respectively;
   receiving, by the user equipment, information indicating which DCI format is associated with the user equipment among the plurality of DCI formats included in the joint DCI format;
   performing, by the user equipment, blind decoding for a corresponding DCI format indicated by the information among the plurality of DCI formats included in the joint DCI format; and
   acquiring, by the user equipment, control information of the user equipment from the corresponding DCI format associated with the user equipment
   wherein the joint DCI format comprises a plurality of regions having fixed sizes for each DCI format included in the plurality of DCI formats, and
   wherein the information comprises an indication of an order of the corresponding DCI format associated with the user equipment as among the plurality of DCI formats.

2. The method of claim 1, wherein the information includes a number of the plurality of DCI formats, information on a position index of the corresponding DCI format associated with the user equipment among the plurality of DCI formats, and a starting point of the plurality of DCI formats.

3. The method of claim 1, wherein the information includes a number of plurality of DCI formats, information on a position index of the corresponding DCI format associated with the user equipment among the plurality of DCI formats, and a type of the plurality of DCI formats.

4. The method of claim 1, wherein, in case the plurality of DCI formats are different from one another, DCI format types being included in the joint DCI formats are limited to two types.

5. The method of claim 1, wherein a cyclic redundancy check attached to the joint DCI format corresponds to a radio network temporary identifier shared by two or more user equipments.

6. The method of claim 1, wherein the plurality of DCI formats are dependent on a transmission mode set up for the plurality of user equipments.

7. A user equipment for use in a wireless communication system, the user equipment comprising:
   a reception module configured to receive a joint downlink control information (DCI) format including a plurality of DCI formats,
   wherein each of the plurality of DCI formats is associated with each of a plurality of user equipments, respectively,
   the reception module is configured to receive information indicating which DCI format is associated with the user equipment among a plurality of DCI formats included in a joint DCI format; and
   a processor,
   wherein the processor is configured to perform blind decoding for a corresponding DCI format indicated by the information among the plurality of DCI formats included in the joint DCI format; and to
   acquire control information of the user equipment from the corresponding DCI format associated with the user equipment,
   wherein the joint DCI format comprises a plurality of regions having fixed sizes for each DCI format included in the plurality of DCI formats, and
   wherein the information comprises an indication of an order of the corresponding DCI format associated with the user equipment as among the plurality of DCI formats.

* * * * *